United States Patent
Hicklin et al.

(10) Patent No.: US 11,379,194 B2
(45) Date of Patent: *Jul. 5, 2022

(54) SYSTEMS AND METHODS FOR AUTOMATIC CODE GENERATION

(71) Applicant: The MathWorks, Inc., Natick, MA (US)

(72) Inventors: Joseph Hicklin, Wayland, MA (US); Claudia Wey, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,056

(22) Filed: Mar. 2, 2021

(65) Prior Publication Data

US 2021/0182034 A1    Jun. 17, 2021

Related U.S. Application Data

(63) Continuation of application No. 16/173,989, filed on Oct. 29, 2018, now Pat. No. 10,949,173.

(51) Int. Cl.
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
None
See application file for complete search history.

(56) References Cited

U.S. PATENT DOCUMENTS

| | | |
|---|---|---|
| 5,862,395 A | 1/1999 | Bier |
| 7,376,904 B2 | 5/2008 | Cifra et al. |
| 7,761,859 B2 | 7/2010 | Low |
| 8,042,093 B1 | 10/2011 | Ogami |
| 8,046,736 B1 | 10/2011 | Freeman et al. |
| 8,504,983 B1 | 8/2013 | Englehart et al. |

(Continued)

OTHER PUBLICATIONS

IPython, "The Ipython Notebook," (https://ipython.org/notebook.html), Apr. 22, 2015, 4 pages.

(Continued)

*Primary Examiner* — Andrew M. Lyons
(74) *Attorney, Agent, or Firm* — Wilmer Cutler Pickering Hale and Dorr LLP

(57) ABSTRACT

In accordance with some embodiments, a non-transitory computer-readable medium storing executable instructions that, when executed by a processor, may cause the processor to receive a value setting via a user interface associated with a first program code, and generate a second program code that, when executed, produces a computational result. To generate the second program code, the instructions, when executed by the processor, may cause the processor to obtain a portion of the first program code that, when executed with the value setting, generates the computational result, determine an organizational structure of the portion, the organizational structure including a plurality of stages, determine, in one or more of the plurality of stages, a first segment of code that accesses the value setting and a second segment of code that does not access the value setting, and replace the first segment with the value setting.

22 Claims, 31 Drawing Sheets

(56) References Cited

U.S. PATENT DOCUMENTS

| | | |
|---|---|---|
| 8,881,022 B2 | 11/2014 | Torgerson et al. |
| 9,053,235 B1 | 6/2015 | Bienkowski et al. |
| 9,329,849 B2 | 5/2016 | Verlaguet |
| 9,645,797 B2 | 5/2017 | Savliwala et al. |
| 9,766,789 B1 | 9/2017 | Nikolaidis et al. |
| 9,952,838 B2 | 4/2018 | Reichle |
| 10,222,944 B1 | 3/2019 | Hicklin et al. |
| 10,223,076 B1 | 3/2019 | Owen et al. |
| 10,296,303 B2 | 5/2019 | Laethem et al. |
| 10,448,227 B2 | 10/2019 | Kamineni et al. |
| 2001/0034879 A1 | 10/2001 | Washington et al. |
| 2002/0147963 A1 | 10/2002 | Lee |
| 2002/0167544 A1 | 11/2002 | Raghavan et al. |
| 2006/0080639 A1 | 4/2006 | Bustelo et al. |
| 2011/0179347 A1 | 7/2011 | Proctor et al. |
| 2013/0111376 A1 | 5/2013 | Shinomoto et al. |
| 2013/0239029 A1 | 9/2013 | Waite et al. |
| 2014/0047413 A1 | 2/2014 | Shelve et al. |
| 2014/0297516 A1 | 10/2014 | Brown et al. |
| 2014/0359566 A1 | 12/2014 | Avadhanula et al. |
| 2015/0205496 A1 | 7/2015 | Lord |
| 2015/0301806 A1 | 10/2015 | Leon et al. |
| 2016/0335100 A1 | 11/2016 | Pyle |
| 2017/0116179 A1 | 4/2017 | Gagne-Langevin et al. |
| 2017/0116396 A1* | 4/2017 | Gu ................... G06F 21/14 |
| 2017/0228229 A1 | 8/2017 | Jain et al. |
| 2017/0315789 A1 | 11/2017 | Lam et al. |
| 2018/0024731 A1 | 1/2018 | Sanches et al. |
| 2018/0285084 A1 | 10/2018 | Mimlitch, III et al. |
| 2019/0187960 A1 | 6/2019 | Wong |

OTHER PUBLICATIONS

The MathWorks, "Example-Generating MATLAB Code to Reproduce a Graph:: Plots and Plotting Tools (MATLAB)", (https://www.mathworks.com/help/releases/R2010a/techdoc/creating_plots/f944170.html), 2 pages.

The MathWorks, "Save Figure to Reopen in MATLAB Later", (https://www.mathworks.com/help/matlab/creating_plots/save-figure-to-reopen-in-matlab-later.html#buneyas-4), 2 pages.

Wolfram, "Wolfram Mathematica," (https://www.wolfram.com/mathematica/), Jul. 9, 2014, 5 pages.

Wolfram, "Wolfram|Alpha Widgets," (https://www.wolframalpha.com/widgets/), May 26, 2011, 1 page.

* cited by examiner

```
function [img, out] = toGenerate(app)              ─ 702
    % read the image
    img = imread(app.InputImage);

if (size(img, 3) == 3)                          ─ 704
        % transform the image to grey scale
        img = rgb2gray(img);
    end % apply the thresholding method
    switch app.MethodDropDown.Value
        case 'global threshold'
            out = imbinarize(img);
        case 'manual threshold'                     ─ 706
            out = img > app.ManualThreshold;
        case 'adaptive threshold'
            T = adaptthresh(img, app.Sensitivity);
            out = imbinarize(img, T);
    end
end
```

SYSTEMS AND METHODS FOR AUTOMATIC CODE GENERATION

CROSS-REFERENCE TO RELATED APPLICATION

This patent application is a continuation of U.S. patent application Ser. No. 16/173,989, filed Oct. 29, 2018, which is hereby incorporated by reference in its entirety as if fully set forth herein.

BRIEF DESCRIPTION OF THE DRAWINGS

FIGS. 1A-1L show an implementation of automatic code generation in accordance with embodiments of the present disclosure.

FIGS. 7A-7E show an implementation of automatic code generation in accordance with embodiments of the present disclosure

DETAILED DESCRIPTION

Figure 1A:
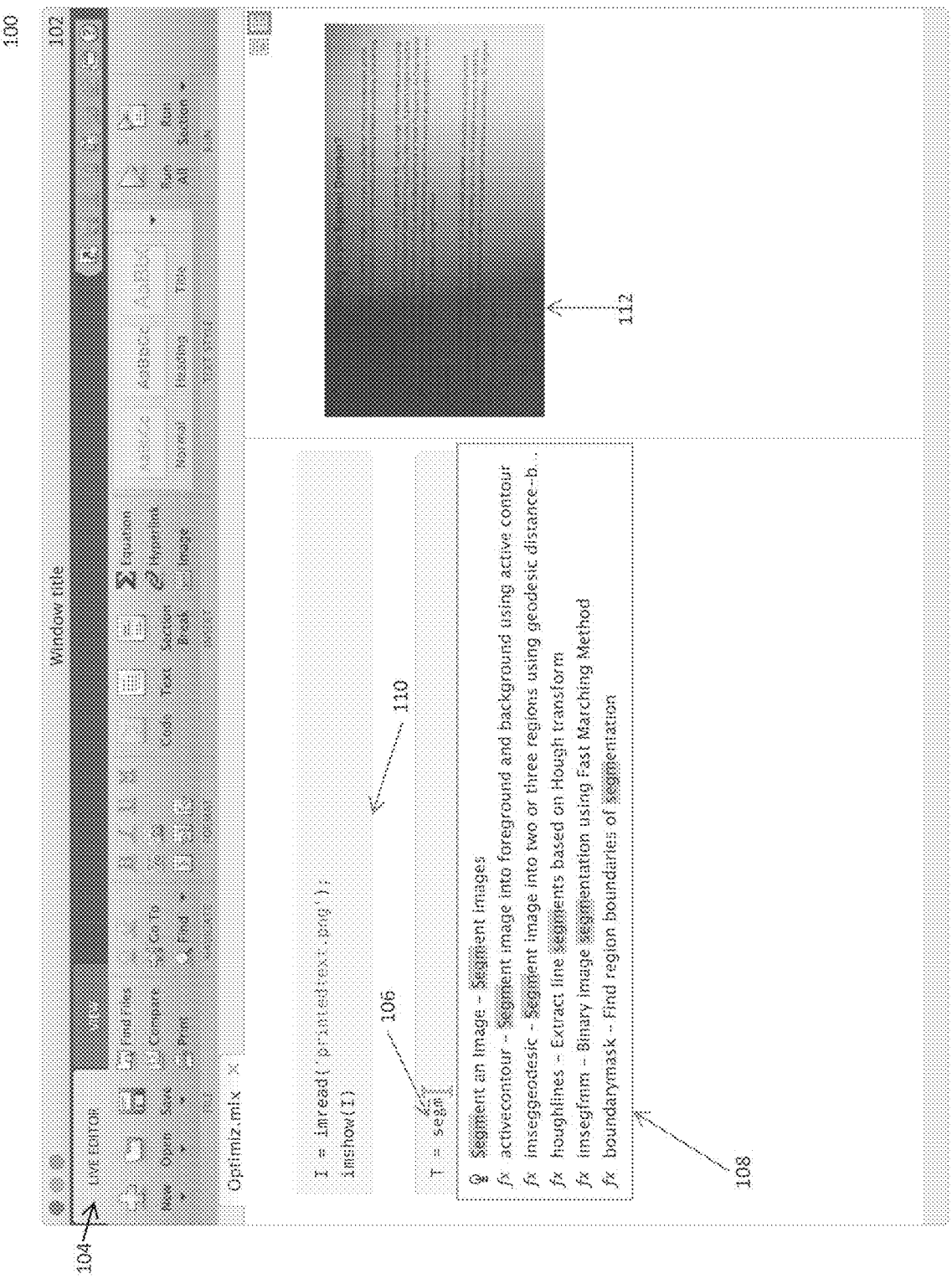

The following detailed description of example implementations and embodiments refers to the accompanying drawings. The same reference numbers in different drawings may identify the same or similar elements. The designs, figures, and description are non-limiting examples of embodiments of the present disclosure. Other embodiments may or may not include the features disclosed herein. Moreover, disclosed advantages and benefits may apply to only one or some embodiments, and should not be used to limit the scope of the present disclosure.

A processor can perform a functionality, e.g., carrying out computations or generating plots, when program code is executed. The program code can be handwritten (e.g., by a computer programmer) in a programming environment. However, writing code can be difficult, time consuming, and error prone. In some implementations, one or more user interface (UI) elements (e.g., graphical user interface (GUI) elements) can be provided, e.g., by a creator or author of the UI element, or by a vendor or another third party, to a user (e.g., a computer programmer) for use, e.g., for embedding in program code to provide desired computational results within the program code. Each UI element can represent one or more functionalities that the user intends to have the processor(s) perform. An application is an example of a UI element.

UI elements may be embedded in the program code. For example, an application may be embedded in program code. For example, during execution of the program code, the UI element may receive input (e.g., control setting) and provide computational output to the program code. In some implementations, the UI element may also be a standalone element for user interaction. For example, in response to an interaction such as a user dragging a slider of the UI or clicking on a button of the UI, the UI element may output a graphical representation of computational results. Embedding the UI elements can eliminate the need for the user to write code for the intended functionalities, e.g., desired UI computational result for use by the code in which the UI element is embedded. Moreover, embedding the UI element may allow for users to interact with a UI rather that textual code. This may allow for more effective visualization of computational results.

In some implementations, the UI elements can be provided to a user upon user request or automatically, such as, during the user's creating of code. For example, one or more UI elements can be triggered to be displayed to a user based on live analysis of the code created by the user at the time the user creates the code. One or more of the displayed UI elements can be selected by the user (e.g., by clicking or dragging) to be embedded into a desired location in the program code. The UI elements may be triggered to generate information for use by the processor(s) to perform the corresponding functionalities. UI elements may not include a manually coded code generator to record manipulation results. Rather, embodiments of the present disclosure may allow for automatic code generation without a manually coded code generator. Embodiments of the present disclosure may be implemented in software that is implanted in an editor, or associated with each UI element. In some implementations, selecting or executing a UI element may trigger code generation. The code generation may generate code that reflects a certain computational function of the UI element. The generated code, when executed, may replicate the computational result provided by the UI element.

Standalone applications may similarly function in the manner discussed above. For example, an application may not be embedded in program code and/or may be run without an editor, but may produce a computational result, which can be displayed on the UI element. By triggering the production of the computational result, code generation may occur that reflects one or more computational functions of the application. The generated code, when executed, replicates the computational result of the standalone application execution. The generated code may be executed within an editor.

However, in order to generate code in response to UI element manipulation, an author of the UI element may be required to compose software code for a code generator that interacts with the UI element and automatically generates code. Generating and maintaining a code generator for each UI element can be costly and time consuming for the author because it is not automated.

Therefore, embodiments of the present disclosure may provide automatic code generation that can relieve authors of UI elements from manually creating code generators for each UI element. An automatic coder generator may be provided that can automatically generate code for all UI elements. An application is an example of a UI element. Automatic code generators as described herein may automatically generate code for existing applications or newly created applications. Moreover, automatic code generation can improve or expand the usability of UI elements. For example, interaction with a UI element may automatically generate or replicate the computational result of the interaction, without a user or author of code having to manually create any code, which may save user and/or author time. Users may prefer being able to automatically generate code because such elements may easily and quickly generate computational results for future use. Providing automatic code generation to a UI element that is embedded in program code may provide easier program flow. For example, the execution of the UI element may be improved because the UI element is part of the same program flow as other program code, and changes to other code of the flow may impact execution of the UI element.

UI elements with automatic code generation can be embedded in program code. When the overall code including the UI element and program code is saved, closed, and reopened at a later time, the UI element exists at the embedded location. In some implementations, information (e.g., the generated code, a link to external code, etc.) associated with the UI element is also provided, and may be saved and re-accessible. In some implementations, the programming environment in which the overall code is generated may establish linkages between information associated with an embedded UI element and the existing code. For example, when the information contains a function name with its arguments, values provided in the code may be linked to the corresponding arguments. The programming environment may also use generated code to perform tasks, such as a function call with appropriate arguments.

A UI element may be associated with (e.g., supported by, compatible with, displayed within, etc.) a technical computing environment (TCE), or may be associated with a tool such as an application designer that allows an author or user to write source code for an application. Applications built with a tool, such as an application designer, may contain source code that automatic code generation software of the present disclosure is capable of understanding and parsing. The UI element may enable the user to create, visualize, and/or manipulate the data and/or the objects. In addition, the UI element may enable the user to create, visualize, and/or manipulate the program code associated with the data and/or the objects. For example, the UI element may enable the user to create, visualize, and/or manipulate the program code that generates or operates on the data and/or the objects. For example, generated code may reflect a computational result caused by a UI element.

In some embodiments, a method may comprise displaying, by one or more processors, a user interface (UI) element associated with UI program code, the UI element embedded in first program code, receiving, by the one or more processors, a first value setting of a UI control of the UI element, executing, by the one or more processors, the UI program code, the executing triggered by the receiving of the first value setting, the executing producing a first result comprising a computational result that is graphically displayed by the UI element, and generating, by the one or more processors and following the executing, second program code comprising a code portion that, when executed, produces the computational result. The generating may comprise determining a first portion of the UI program code that, when executed with the first value setting, generates the first result, obtaining the first portion, and replacing a first segment of code in the obtained first portion that accesses the first value setting of the UI control with the first value setting.

In some embodiments, the generating may further comprise determining, by the one or more processors, a second segment of code in the first portion that produces graphical configurations of the UI element, and removing, by the one or more processors, the second segment from the obtained first portion.

In some embodiments, the method may comprise determining, by the one or more processors, a third segment of code in the first portion that produces the graphical display of the computational result, and removing, by the one or more processors, the third segment from the obtained first portion.

In some embodiments, the generating may comprise determining, by the one or more processors, a second segment of code in the first portion that does not access the first value setting of the UI control, and removing, by the one or more processors, the second segment of code from the obtained first portion.

In some embodiments, the generating may comprise determining, by the one or more processors, an organizational structure of the first portion, the organizational structure including a first stage and a second stage, and identifying, by the one or more processors, a first element of the second segment located in the first stage and a second element of the second segment located in the second stage.

In some embodiments, the method may include removing of the second segment comprises removing the first element and removing the second element.

In some embodiments, the organizational structure may be a parse tree comprising a plurality of hierarchical nodes, and the first stage includes a lower hierarchical node relative to the second stage.

In some embodiments, the first element may be removed from the first stage before the second element is removed from the second stage.

In some embodiments, the first element may be removed from the first stage after the second element is removed from the second stage.

In some embodiments, the UI control may include a conditional function.

In some embodiments, the conditional function may be one of an if statement or a while statement.

In some embodiments, the first value setting may be received due to execution of third program code.

In some embodiments, the first value setting may be received due to a manipulation of the UI element.

In some embodiments, the manipulation comprises an interaction with at least one of a slider or button associated with the UI element.

In some embodiments, a method may comprise displaying, by one or more processors, a user interface (UI) element associated with UI program code, the UI element embedded in first program code, receiving, by the one or more processors, a first value setting of a UI control of the UI element, executing, by the one or more processors, the UI program code, the executing triggered by the receiving of the first value setting, the executing producing a first result comprising a computational result that is graphically displayed by the UI element, and generating, by the one or more processors during the executing of the UI program code, second program code comprising a code portion that, when executed, produces the computational result. The generating may comprise determining a first portion of the UI program code that, when executed with the first value setting, generates the first result, obtaining the first portion of the UI program code, replacing a first segment of code in the obtained first portion that accesses the first value setting of the UI control with the first value setting, evaluating at least one conditional function of the first portion of the UI program code, removing the evaluated at least one conditional function from the obtained first portion, determining, by the one or more processors, a second segment of code in the first portion that does not access the first value setting of the UI control, and removing, by the one or more processors, the second segment of code from the obtained first portion.

In some embodiments, the generating may further comprise determining, by the one or more processors, an organizational structure of the first portion, the organizational structure including a first stage and a second stage, and identifying, by the one or more processors, a first element of the second segment located in the first stage and a second element of the second segment located in the second stage.

In some embodiments, the removing of the second segment may comprise removing the first element and removing the second element.

In some embodiments, the conditional function may be one of an if statement or a while statement.

In some embodiments, the first value setting may be received due to at least one of execution of third program code or a manipulation of a slider or button of the UI element.

In some embodiments, a method comprises receiving, by the one or more processors, a first value setting of a user interface (UI) control of a UI element, the user interface (UI) element associated with UI program code, executing, by the one or more processors, the UI program code, the executing triggered by the receiving of the first value setting, the executing producing a computational result, and generating, by the one or more processors and following the executing, second program code comprising a code portion that, when executed, produces the computational result. The generating may comprise determining a first portion of the UI program code that, when executed with the first value setting, generates the first result, obtaining the first portion of the UI program code, determining, by the one or more processors, a first segment of code in the first portion that does not access the first value setting of the UI control, and removing, by the one or more processors, the first segment of code from the obtained first portion.

FIGS. 1A-1K are diagrams of an overview of an example implementation 100 described herein.

FIG. 1A shows an example implementation 100 having a programming environment TCE 102. In some implementations, a code editor 104 may be displayed within TCE 102 on a screen associated with a device (e.g., a screen connected with a client device or a server device). Code editor 104 may, for example, include a code editor window that permits a user to input and/or view program code. In some implementations, the TCE 102 may not include a code editor 104, and some other kind of programming environment may be present. In some implementations, a device may host TCE 102 and/or code editor 104. Additionally, or alternatively, a device may host TCE 102 and/or code editor 104, and may allow another device to access to TCE 102 and/or code editor 104 via the hosting device.

In some implementations, a user may interact with TCE 102 using an input component associated with the device (e.g., a keyboard, a touch screen, a mouse, or a touch pad connected with the device). Additionally, or alternatively, the user may interact with TCE 102 using an input mechanism associated with TCE 102 (e.g., a button, a menu, or a menu item displayed by, displayed within, connected with, etc. TCE 102). For example, the user may use a mouse to interact with TCE 102 to select or click a button associated with TCE 102 (e.g., a "Save" button displayed by, displayed within, connected with, etc. TCE 102).

In some implementations, systems and/or methods (e.g., software and/or applications installed, or executing, on the device) may provide a UI element for display. For example, the systems and/or methods may provide the UI element for display via TCE 102. In some implementations, a user may type in input code 106 (which can be a particular function name) via an input device, and the input code may generate display of a UI element when executed. In some implementations, suggested code 108 for input code 106 may be generated and displayed for selection via TCE 102 based on the typing of the user. In some implementations, processing of input code 106 may provide an application, such as a UI element.

Code 110 may be input into TCE 102 by a user via an input device. In some implementations, code 110 may be associated with input code 106, and input code 106 may manipulate the result produced by executing code 110. In the example of FIG. 1A, code 110 provides for the importing of an image named "printedtext.png" into TCE 102, assigning variable "I" to the imported image, and the displaying of the image within TCE 102 using "imshow(I)." The image is shown as reflected by numeral 112 within TCE 102.

In some implementations, the input code 106 may be typed into TCE 102 as noted above. In some implementations, the input code 106 may be dragged and dropped into TCE 102 from another environment. In some implementations, the input code 106 may have already been executed and an application already generated. The application may be imported and embedded within existing code of TCE 102. For example, the application may be embedded within existing code of TCE 102 that includes code 110. It should be noted that input code 106 (i.e., the "segment image" example) shown in FIG. 1A, as well as 1B-1J, is exemplary, and an application may be imported and embedded within existing code of TCE 102 that is different from "segment image."

Figure 1B:
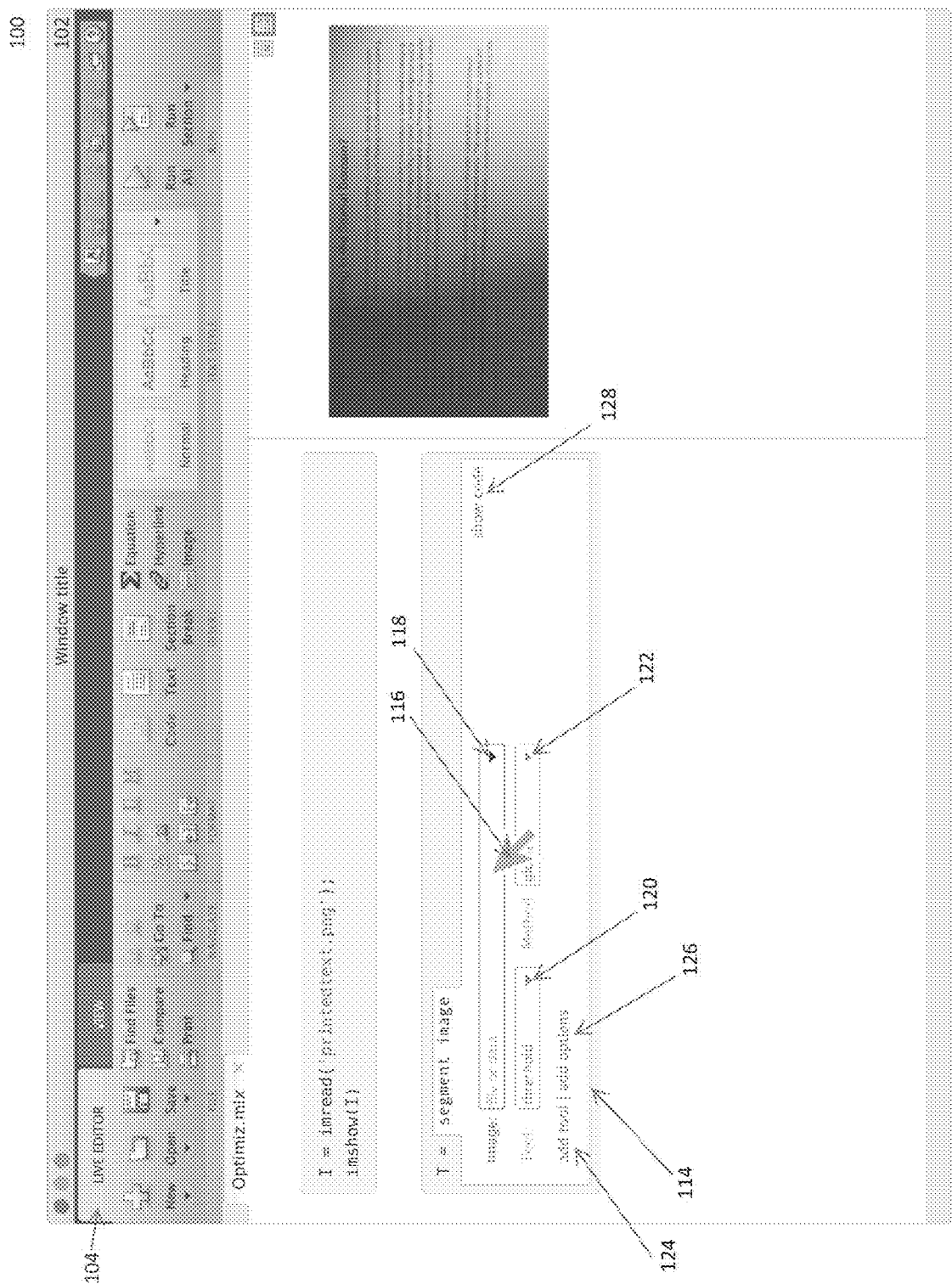

FIG. 1B shows an implementation where input code 106 of FIG. 1A has been processed to provide application 114. Application 114 may be a UI element, for example. In some implementations, application 114 may be interacted with using a curser 116, for example. In some implementations, a user may interact with the UI element by clicking on one or more interactive parts of application 114. For example, a user may click on one or more of drop-down menu, buttons, links, or any other interactive elements of application 114. For example, a user may click on one or more of drop down menus 118, 120, and 122. In the example of FIG. 1B, drop down menu 118 reflects selecting a particular file or data for manipulation by the "segment image" application 114, drop down menu 120 reflects selecting a particular tool for the manipulation, and drop-down menu 122 reflects selecting a particular method for using the tool. Moreover, for example, a user may click on one or more of items 124 and/or 126 to further interact with application 114. A user may click on item 124 to add one or more further tools to application 114, and may click on item 126 to add one or more further options regarding application 114. Further, for example, a user may click on item 128 to show the generated code that is executed to produce application 114 when input code 106 is executed.

Figure 1C:
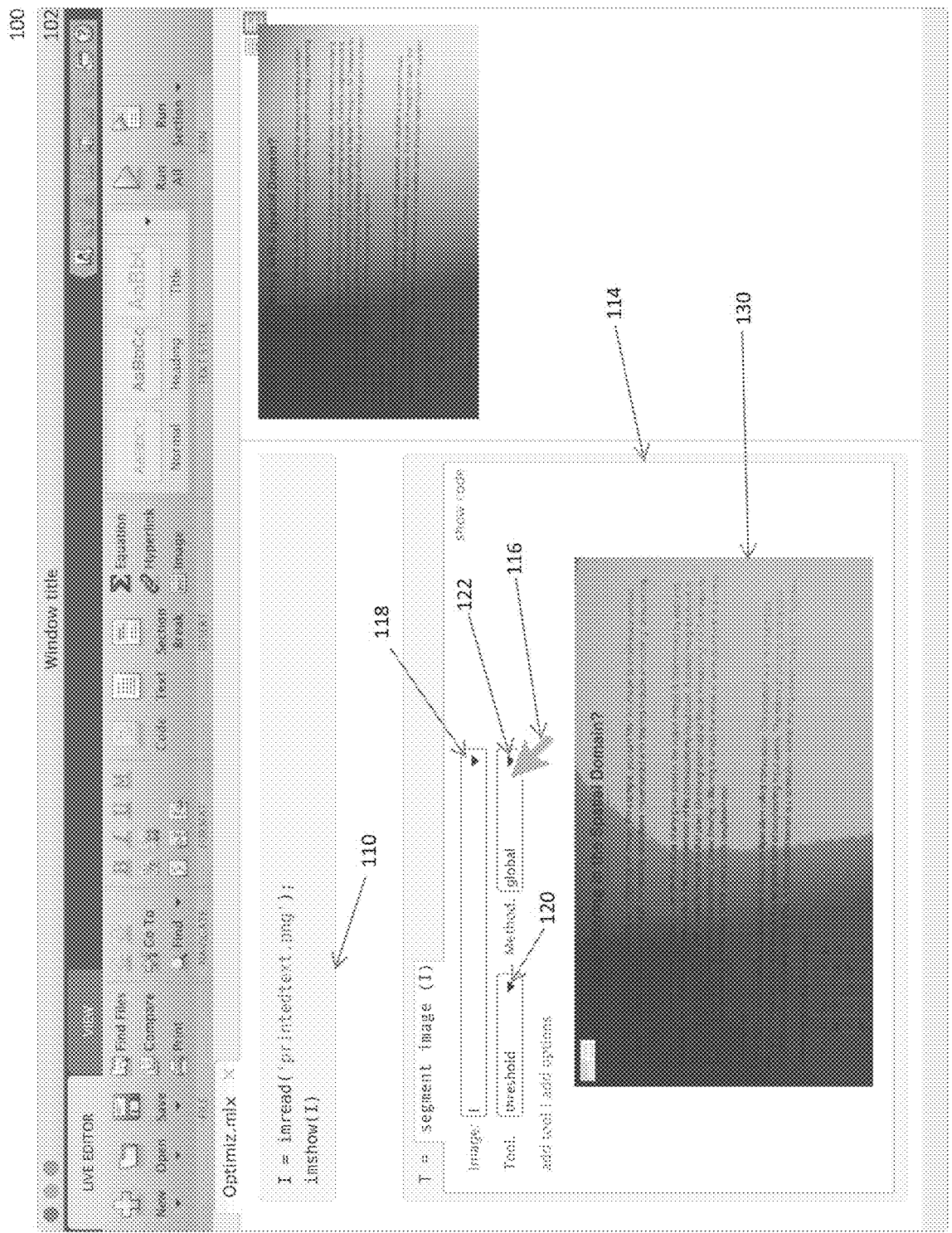

FIG. 1C shows that the image "I" has been selected by a user for manipulation by application 114 via menu 118, that a threshold tool has been selected via drop-down menu 120, and that a global method has been selected via drop-down menu 122. Furthermore, a manipulated image 130 is displayed by application 114. Manipulated image 130 is image I that has had the threshold tool with global method applied to it.

Figure 1D:
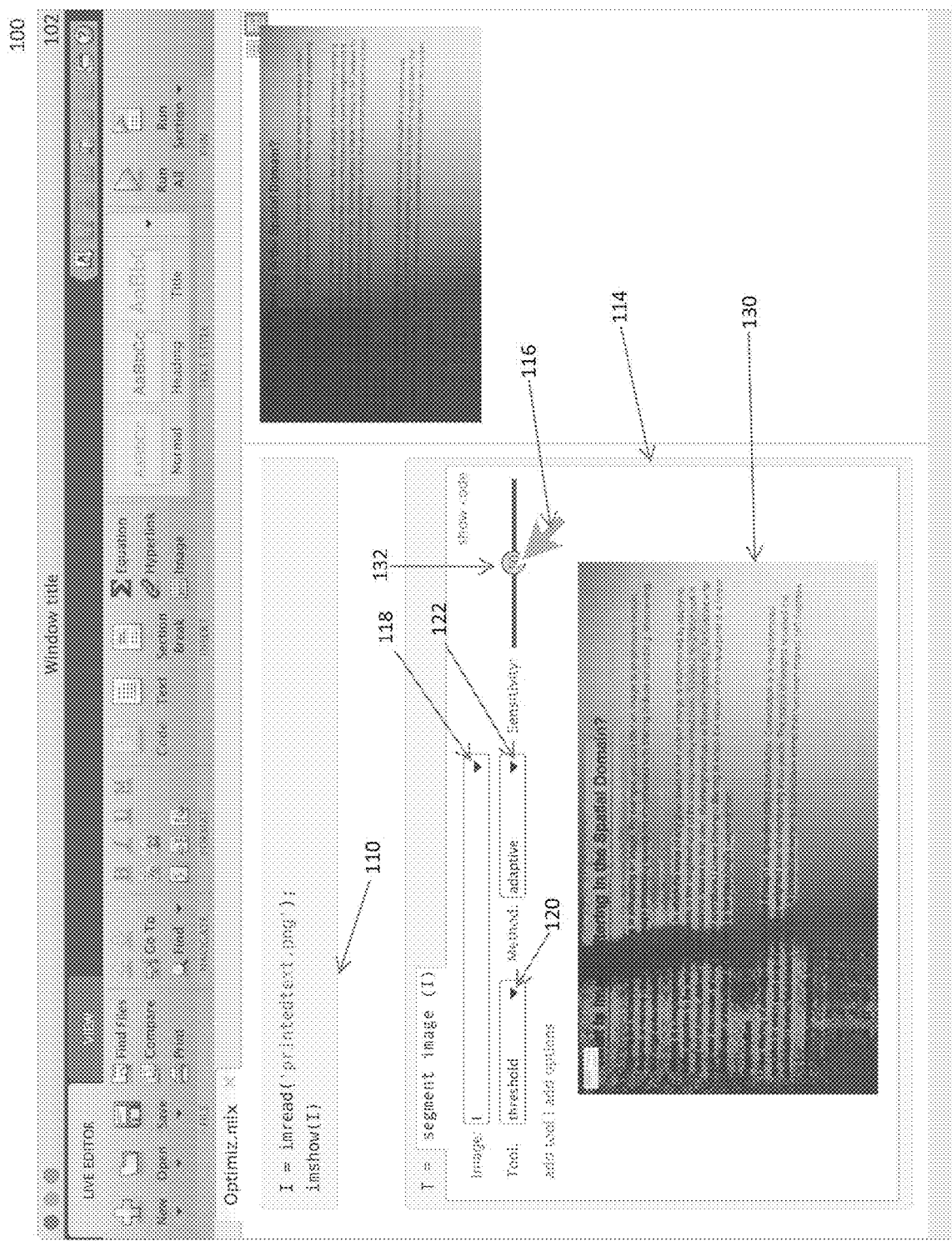

FIG. 1D shows that drop-down menu 122 has been interacted with so that an adaptive method of the threshold tool is used. This method provides a sensitivity slider 132 displayed by application 114. A user may interact with slider 132 by dragging it to the left or the right to change an associated sensitivity value of the threshold tool. In the example of FIG. 1D, the slider 132 is dragged such that it reflects a sensitivity value of 50. In turn, the dragging adjusts the computational result reflected by manipulated image 130 in accordance with this value. In some embodiments, slider 132 may be a different type of UI element that adjusts a sensitivity, such as a button or knob, for example. In this example, the sensitivity impacts how application 114 processes a loaded image. By adjusting the sensitivity value, the computational result of the processing performed by application 114 changes, and manipulated image 130 changes. This change is reflected when comparing manipulated image 130 in FIG. 1D and FIG. 1E.

Figure 1E:
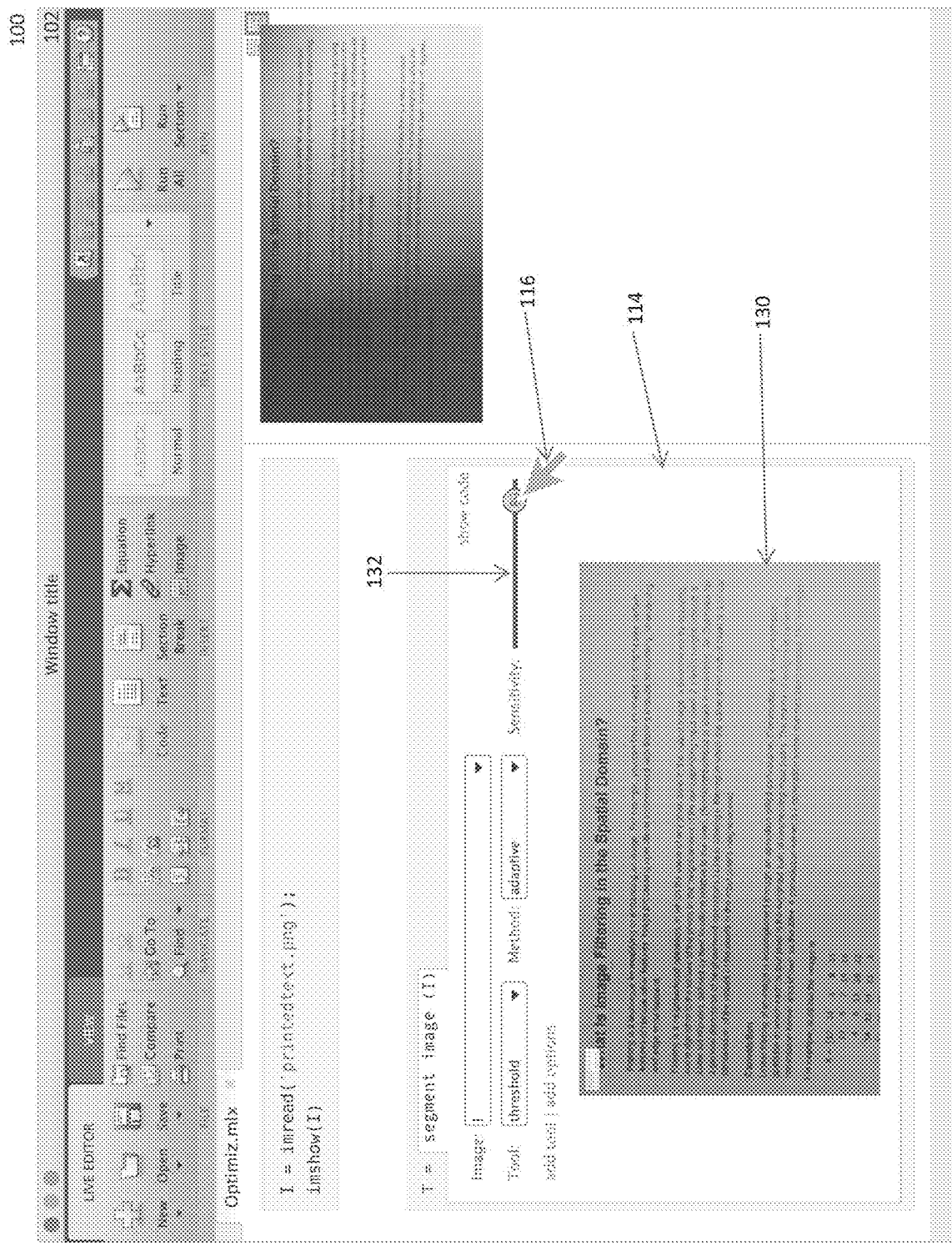

FIG. 1E shows the dragging slider 132 so that it reflects a sensitivity value of 89. The dragging adjusts the computational result reflected by manipulated image 130 in accordance with this value.

Figure 1F:
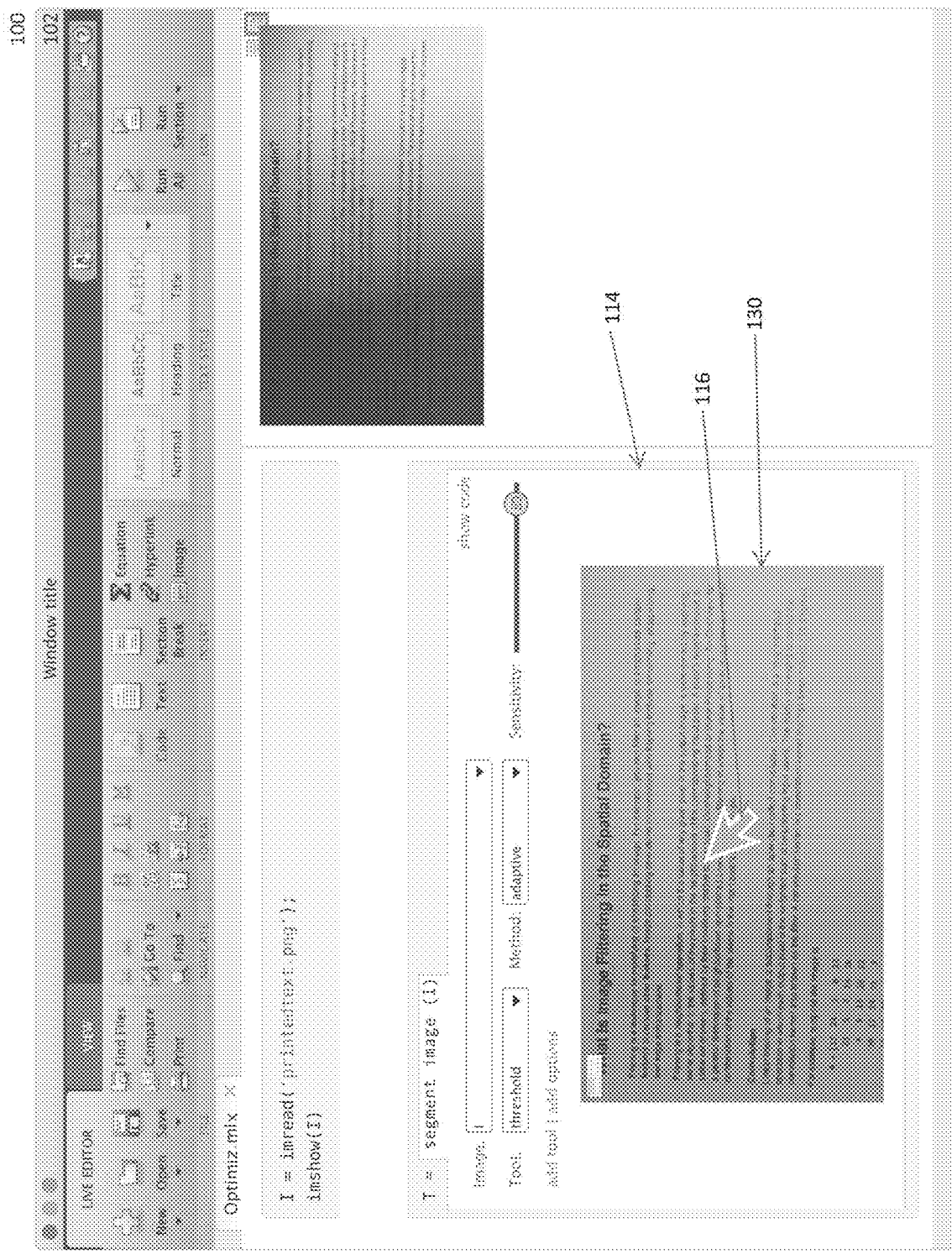
Figure 1G:
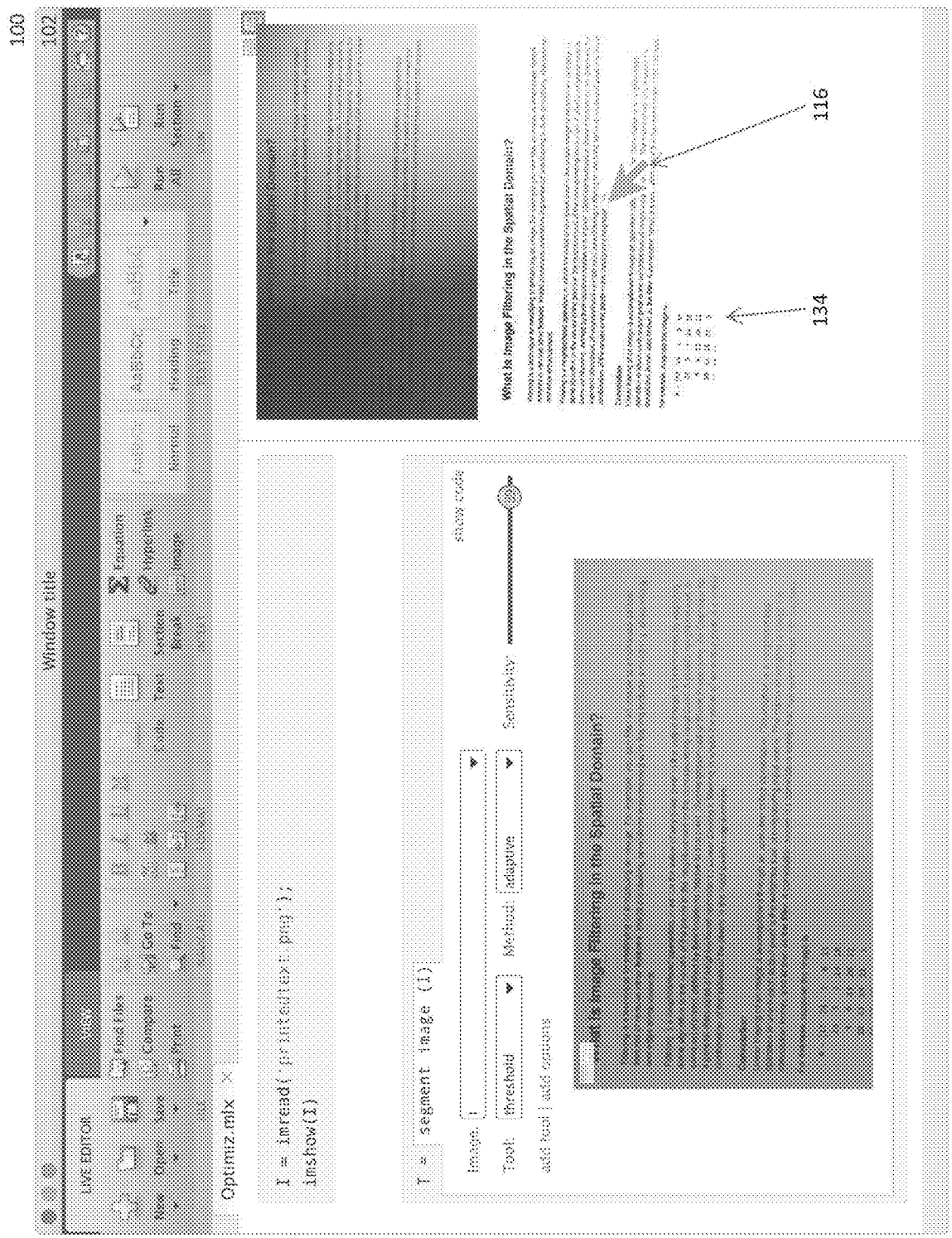

FIGS. 1F and 1G show selection and dragging of a manipulated image 130 to an area 134 of TCE 102. Specifically, FIG. 1F shows selecting a manipulated image 130 with curser 116. FIG. 1G shows the result of dragging the image to area 134 of TCE 102 such that the manipulated image 130 exists in area 134. FIGS. 1F and 1G reflect how elements of an application may be interacted with using a cursor 116, and also how a TCE 102 may accept elements of from an application (e.g., by dragging and dropping, or placing, elements from an application into an area of TCE 102).

Figure 1H:
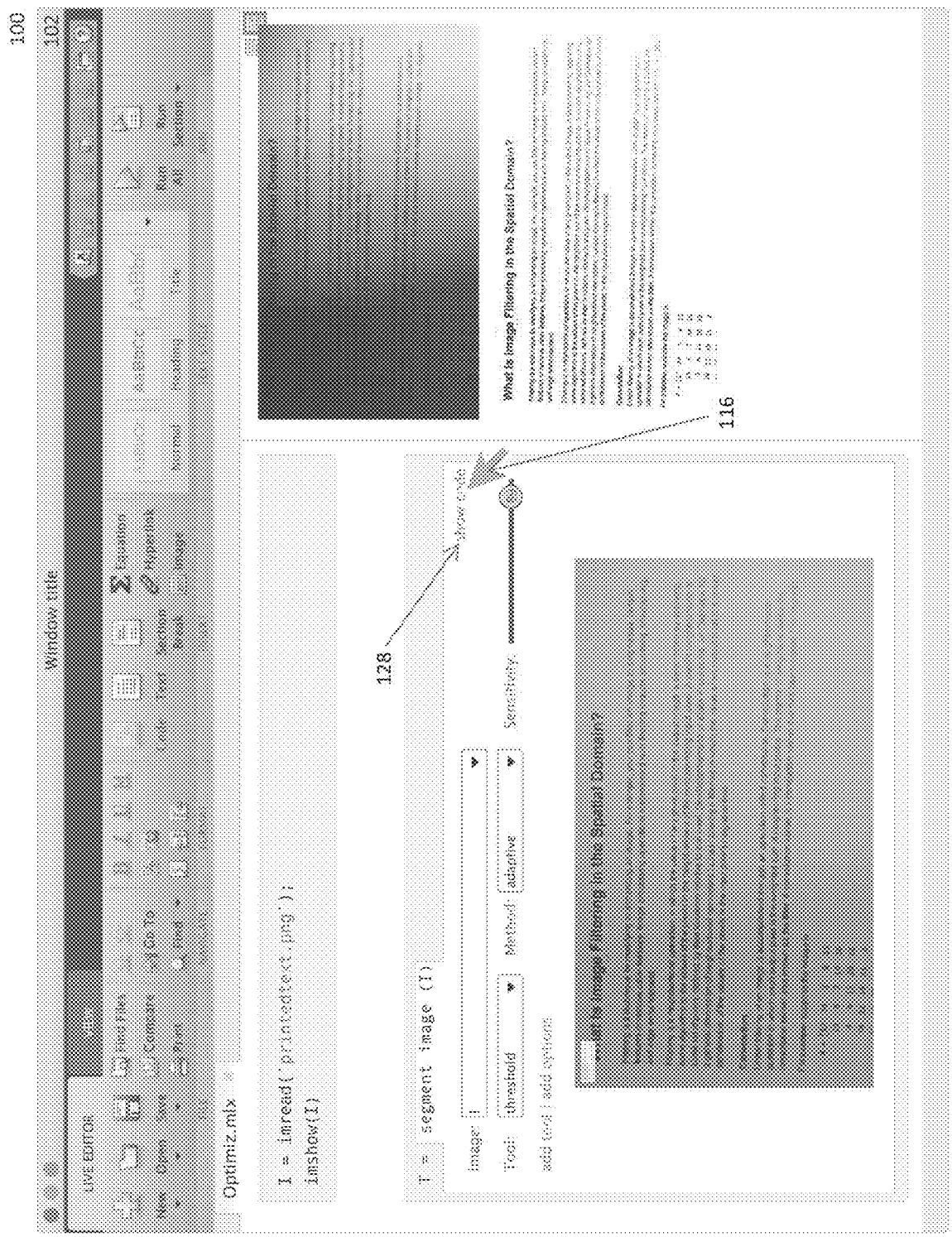
Figure 11:
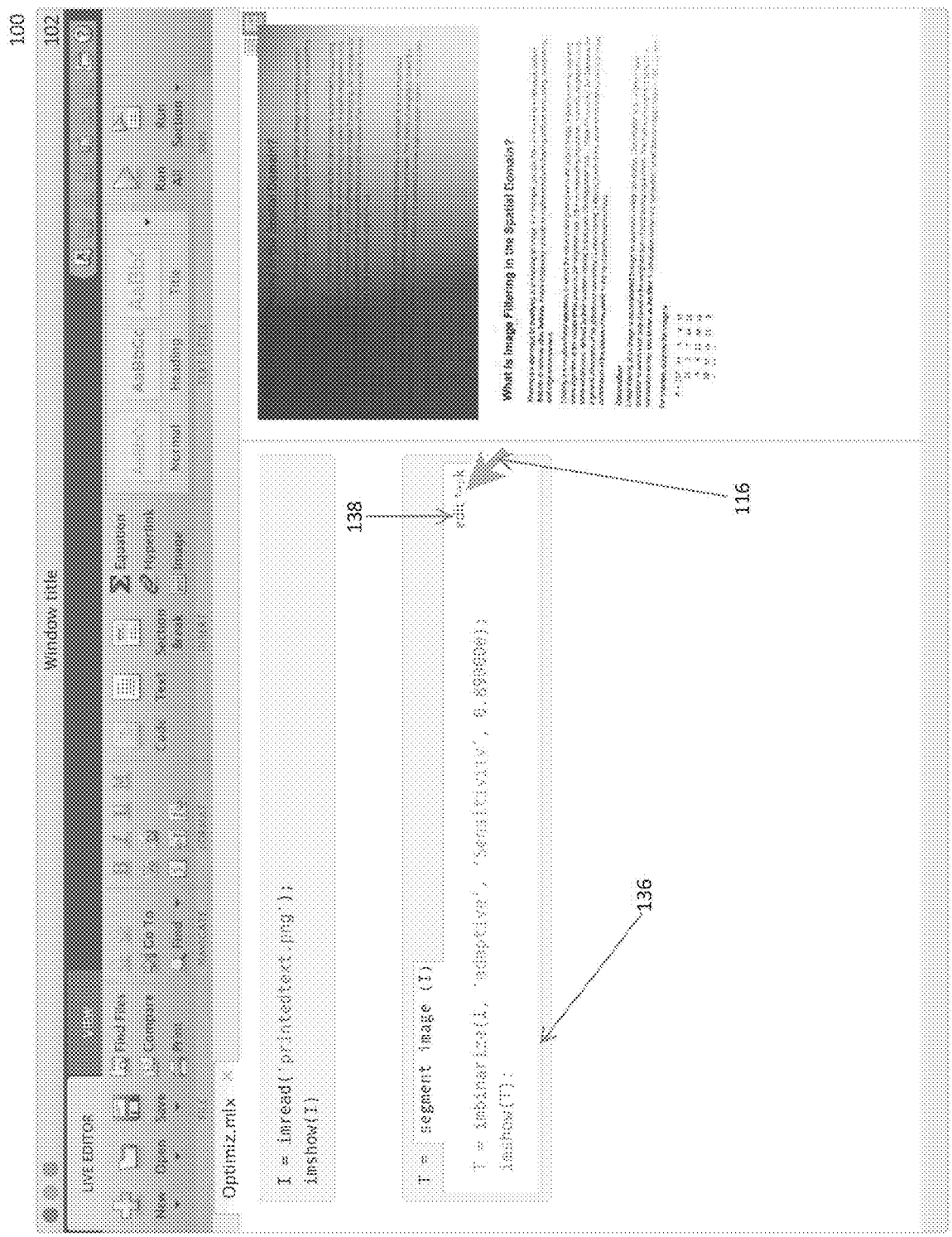

FIG. 1H shows selection of item 128 by curser 116, which allows for the showing of the generated code that provides the computational result of manipulation of application 114. FIG. 1I shows this generated code 136. Generated code 136 may be automatically generated in accordance with embodiments of the present disclosure due to interactions with application 114. For example, execution of the generated code 136 may reflect the computational result of the interactions performed by a user selecting the "adaptive method" as discussed with respect to FIG. 1D and dragging slider 132. Generated code may be thereafter applied to other images different from image "I" to produce manipulated images 130 reflecting manipulations performed on these different images. As shown by FIG. 1I, for example, curser 116 may be used to select an "edit task" icon 138. [the purpose is not to adjust the code. Code is adjusted or new code is generated as a result of new user interaction.] Generated code 136 may be generated when the UI element is manipulated, where only the UI element code may be executed. In some embodiments, generated code 136 may be generated when program code including the UI element, as well as additional code, is executed.

Figure 1J:
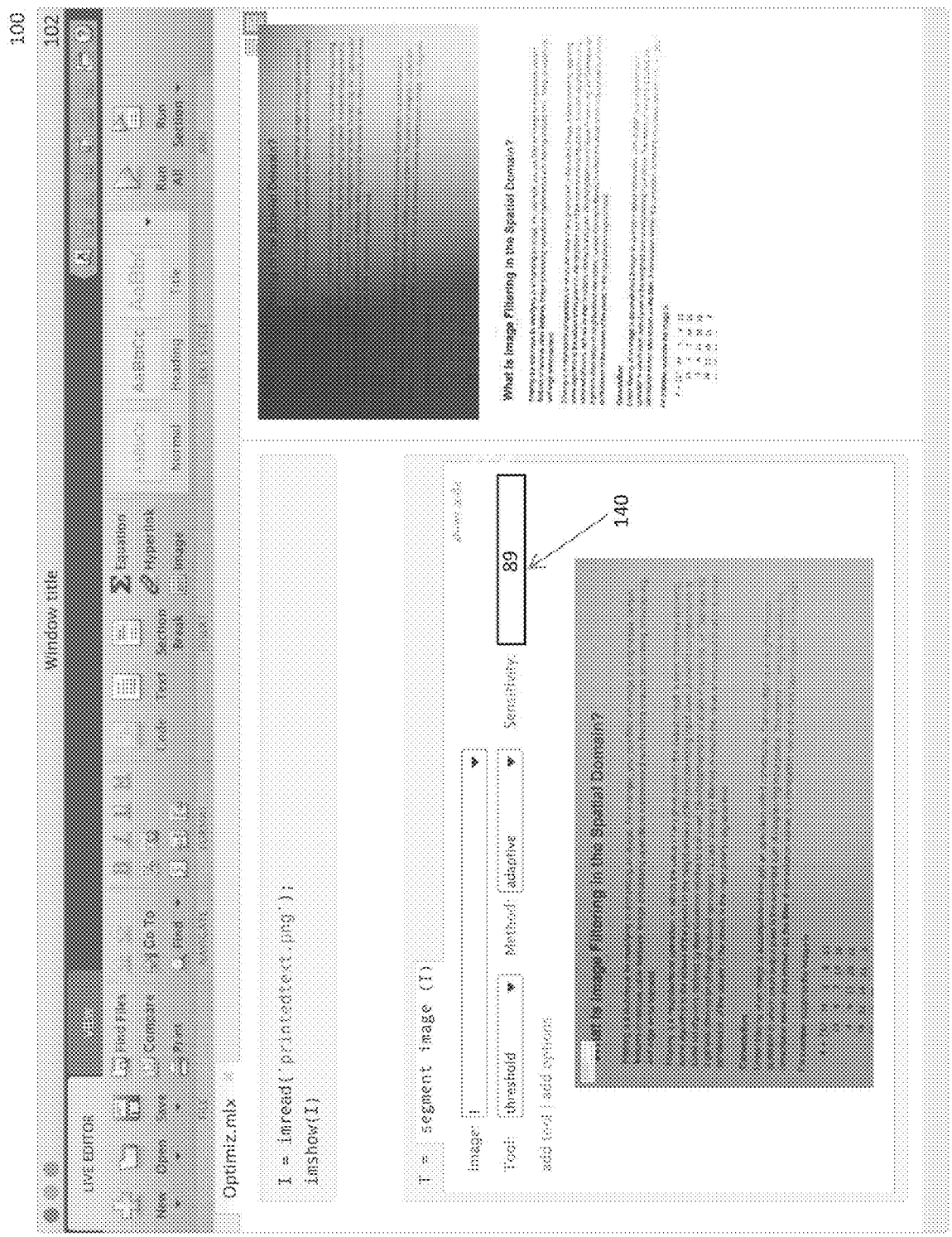

FIG. 1J shows TCE 102 where the slider 132 of FIG. 1H is replaced by a value 140. The value 140 may be set by other program code that is external to the code within TCE 102, or that is external to application 114 within TCE 102. For example, other program code may produce an output that specifies what value 140 should be. This other program code may interact with application 114 such that value 140 is set to a particular value by the other program code. In the example of FIG. 1J, the other program code sets value 140 to a sensitivity value of 89. FIG. 1J therefore shows an example where other program code external to application 114 sets value 140 rather than interaction (e.g., using a cursor) by a user of the UI.

Figure 1K:
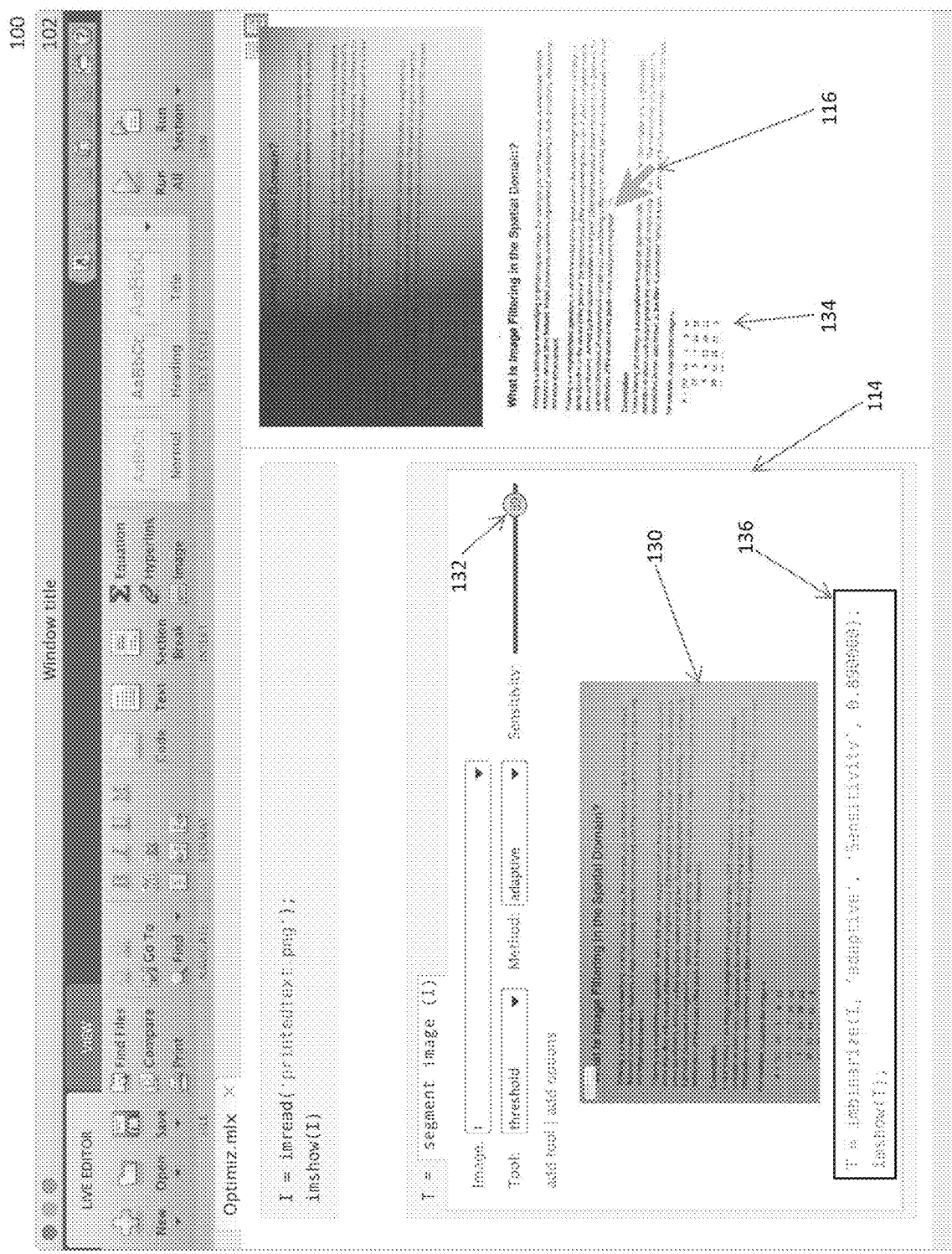

FIG. 1K shows an embodiment where generated code 136 is displayed within TCE 102 along with a manipulated image 130 rather than after selection of item 128. Generated code 136 may be automatically generated in accordance with embodiments of the present disclosure due to interactions with application 114. For example, generated code 136 may be displayed with TCE 102 along with any other viewable element such that changes to the generated code 136 may be viewed as they are made due to user or other program interaction with application 114. For example, a user may drag slider 132 to a new value, such as a value of 89, and this interaction may cause generated code 136 to change such that the value of 89 is reflected by it. In this embodiment, this change in generated code 136 may be viewed as it is made.

Figure 1L:
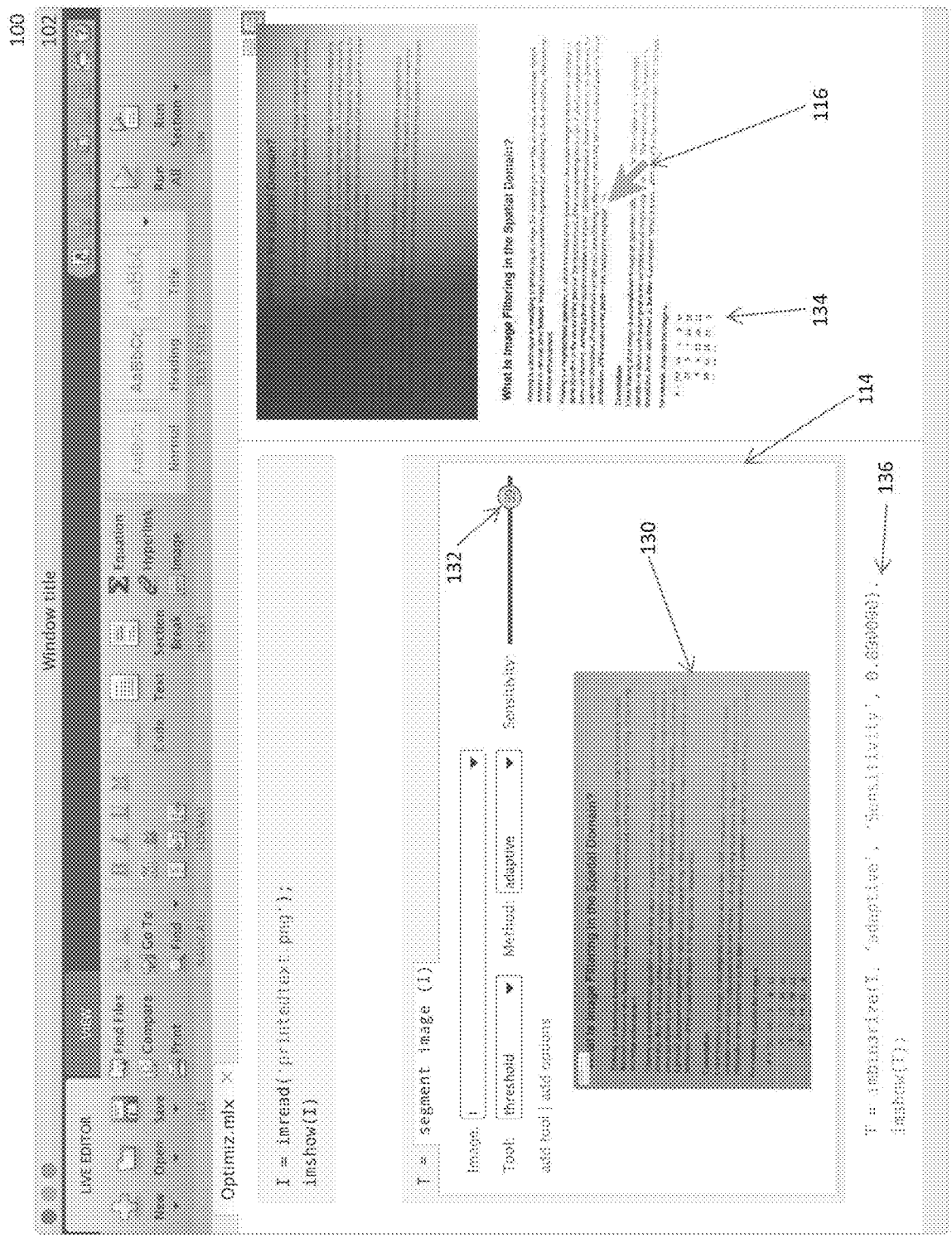

FIG. 1L shows another embodiment where generated code 136 is displayed within TCE 102 along with manipulated image 130. However, in FIG. 1L, generated code 136 may be positioned outside of application 114, but within TCE 102.

Embodiments of the present disclosure may allow a user of an application to input data, view data, and/or manipulate data. In some implementations, the systems and/or methods may automatically generate program code that replicates a computational result of the user's interactions with an application. For example, the systems and/or methods may automatically generate program code that replicates a computational result of the user's interactions with an application such that execution of the generated program code replicates the result. In some implementations, code may interact with the UI element. For example, code in which a UI element is embedded or external code (e.g., as noted with respect to FIG. 1J) may interact with a UI element to provide an input to or receive output from the UI element. In some implementations the systems and/or methods may automatically generate program code to replicates a computational result caused by interactions by external code with the UI element. For example, the systems and/or methods may automatically generate program code that, when executed, replicates the computational result caused by the interactions of the external code such that execution of the generated program code replicates the computational result.

Figure 2:
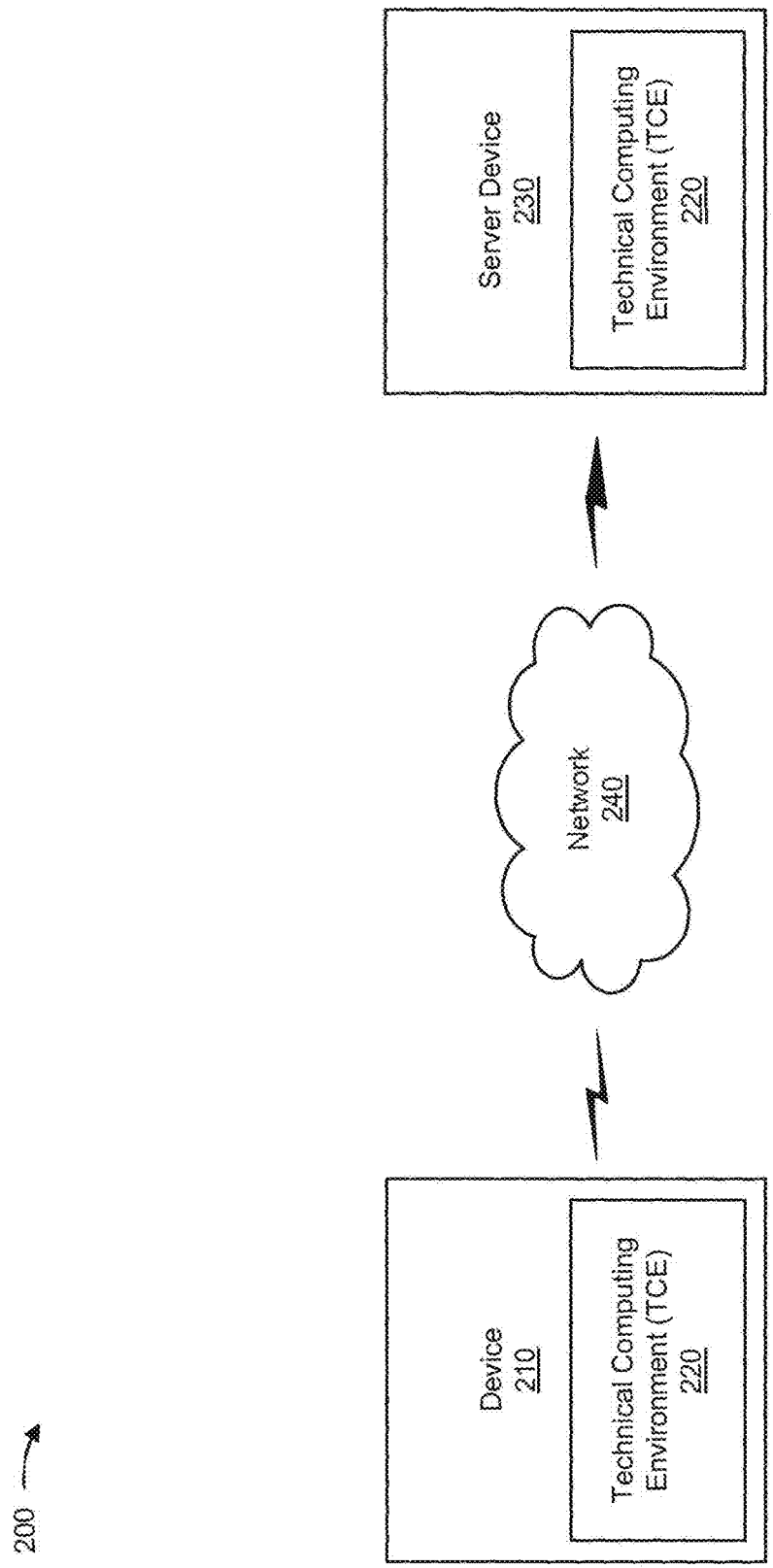
FIG. 2 is a diagram of an example environment in which systems and/or methods described herein may be implemented.

FIG. 2 is a diagram of an example environment 200 in which systems and/or methods, described herein, may be implemented. It should be noted that systems and/or methods described herein need not be implemented in example environment 200, and may be implemented in different environments outside of environment 200. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 can include one or more devices capable of receiving, generating, storing, processing, and/or providing program code and/or information associated with program code (e.g., a program code segment, or a UI element). For example, client device 210 may include a computing device, such as a desktop computer, a laptop computer, a tablet computer, a mobile phone (e.g., a smart phone or a radiotelephone), or a similar type of device. In some implementations, client device 210 may receive information from and/or transmit information to server device 230.

Client device 210 may host TCE 220. TCE 220 includes any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment, a graphically-based environment, or another type of environment, such as a hybrid environment that may include, for example, a text-based environment and a graphically-based environment. Examples of such environments can include: MATLAB® software by The Math Works, Inc.; Simulink® software, Stateflow® software, or SimEvents® software, by The Math Works, Inc.; VisSim by Visual Solutions; LabView® by National Instruments; Agilent VEE by Agilent Technologies; Advanced Design System (ADS) by Agilent Technologies; Agilent Ptolemy by Agilent Technologies; Python, Julia, Mathematica, and Jupyter notebooks.

TCE 220 may include, for example, a user interface that permits a user to create and/or modify program code. For example, TCE 220 may provide a code editor that permits a user to create and/or modify program code. In some implementations, TCE 220 may permit the user to create and/or modify program code by inputting the program code as text. Additionally, or alternatively, TCE 220 may provide one or more UI elements, and the user may interact with the UI element(s) to cause TCE 220 to generate program code. For example, the user may interact with a UI element to visualize and/or manipulate data or an object, and TCE 220 may generate program code based on the interaction of the user with the UI element.

Server device 230 can include one or more devices capable of receiving, generating, storing, processing, and/or providing program code and/or information associated with program code. For example, server device 230 may include a computing device, such as a server, a desktop computer, a laptop computer, a tablet computer, or a similar type of device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a UI) may be separated from back-end applications (e.g., program code execution). Additionally, or alternatively, server device 230 may perform one, more, or all operations described elsewhere herein as being performed by client device 210.

Network 240 includes one or more wired and/or wireless networks. For example, network 240 may include a cellular network, a public land mobile network (PLMN), a local area network (LAN), a wide area network (WAN), a metropolitan area network (MAN), a telephone network (e.g., a Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
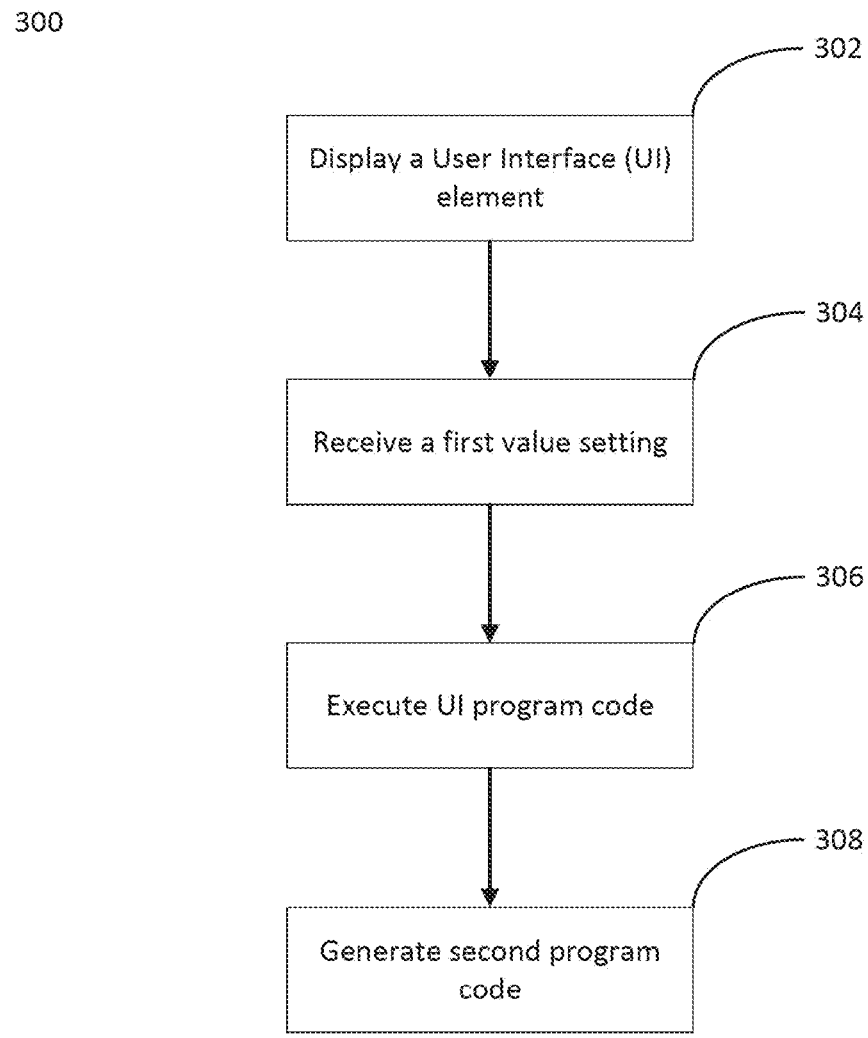
FIG. 3A-3B are flow charts of an example process in accordance with embodiments of the present disclosure.

FIG. 3A is a flow chart of an example process 300 in accordance with embodiments of the present disclosure. Example process 300 may be used to automatically generate code that reflects interactions with a user interface (UI) element. In some embodiments, a client device 210 may perform one or more process blocks of process 300. In some embodiments, client device 210 may perform one or more of the process blocks of process 300, and another device or a group of devices separate from or including client device 210, such as server device 230, may perform one or more process blocks of process 300.

As shown in FIG. 3A, process 300 may include displaying a UI element at block 302. The UI element may be produced by execution of its UI program code provided by an author of the UI element, and may therefore be associated with its UI program code. The UI element may be embedded in first program code. The first program code may be program code that contains the UI program code and may reference and/or interact with the UI program code, but is separate from the UI program code. For example, the first program code may be programming scripts external to the UI program code. For example, the UI program code and the first program code may be stored at different locations. The different locations may be locations within the same memory, or locations within different memories. For example, referring to FIG. 1B, the displayed UI element of block 302 may be application 114. The UI program code may, for example, be code 136 shown in FIG. 1I. The first program code may, for example, be code 110 shown in FIG. 1C.

The UI element may be displayed on one or more of a client device 210 and server device 230, for example. The UI element may be a graphical user interface (GUI), and may reflect a calculation, a graph, or a chart, for example. The UI element may be displayed in an editing environment, such as TCE 102. The UI element may alternatively be displayed in any other programming environment. The UI element may be manipulatable by an interaction. For example, the UI element may include one or more of a slider or button. A user may interact with the UI element by using a cursor, for example, to click on the button or draft the slider. In some embodiments, a user may interact with the UI element via a touch screen interface, for example, to press a displayed button or slide or drag a displayed slider via the touch screen. In some embodiments, any other kind of device, such as a keyboard, may be used to interact with the UI element. In some embodiments, the UI element may be manipulatable by an interaction from other program code, such as the first program code.

As shown in FIG. 3A, process 300 may include receiving a first value setting at block 304. The first value setting may be a setting associated with a UI control. The UI control may be an item of the UI element discussed above that is manipulatable by an interaction. For example, the UI control may be a slider, a button, or a knob displayed by the GUI. The UI control receives set values that can be an input to a function or a value to a variable in the source code of the UI element to produce a computational result that is reflected by an output, manipulation, change, or adjustment, for example, of data or a file, which can be displayed by the UI element. For example, the UI control may include a conditional function such as an "if" or "while" function that can be used to implement a certain computational result that is reflected by an output, manipulation, change, or adjustment, for example, to a file or data displayed by the UI element. UI control may be reflected in the UI element by a button or a slider, for example. For example, in some embodiments, the UI control may be reflected by a button that applies a certain filter to an image displayed in the UI element or starts playback of a video. In some embodiments, the UI control may be reflected by a slider that adjusts a value associated with data or a file displayed in the UI element when dragged. For example, a slider may be adjusted to change the computational result of processing applied to an image, which thereby changes how an image displayed by the UI element looks. The first value setting may be associated with a setting of a button or slider of the UI element. For example, the first value setting may be a value to which a slider of the UI element is set. In some embodiments, the first value setting may be a value that a button of the UI element causes to be set when the button is pressed or otherwise interacted with. For example, the first value setting may be received by user interaction of dragging a slider 132 using cursor 116 as shown in FIG. 1E. In another example, the first value setting may be received due to execution of external program code as discussed with respect to item 140 in FIG. 1J.

In some embodiments, the first value may be received due to execution of external program code. For example, code that is not associated with the UI element may produce an output value that is used to set a value of the UI control, such as the first value setting.

Figure 3B:
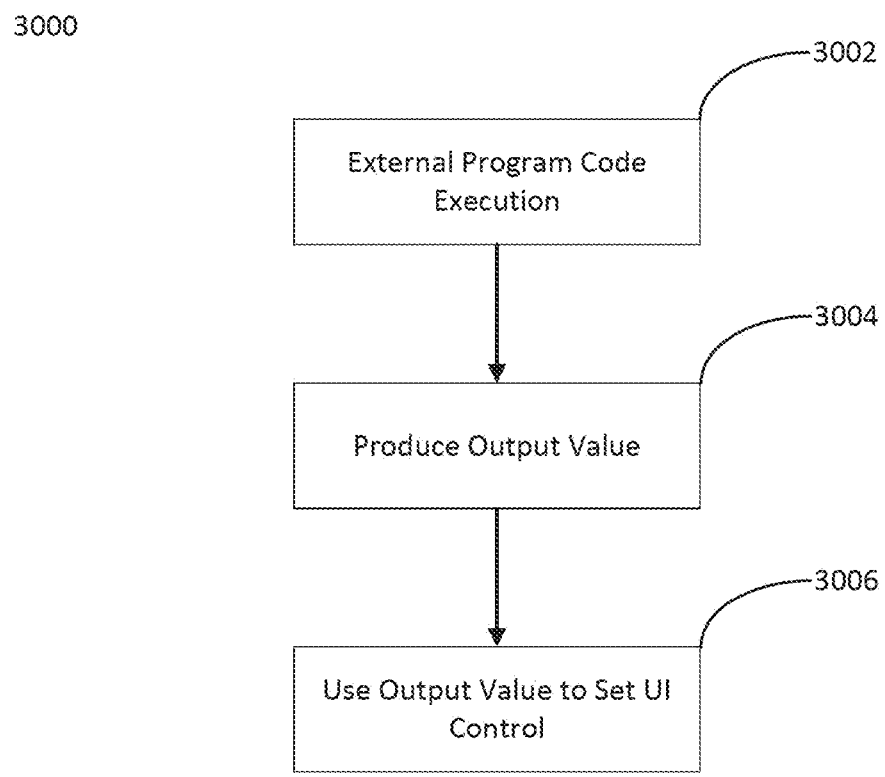

FIG. 3B shows this process 3000. For example, external program code may be executed at step 3002. The external program code may be associated with generating an output value for control of a UI element. For example, the external program code may be used to generate an output value that controls the sensitivity of image processing control, or the amount of brightness by which an image should be adjusted during image processing. At step 3004, the output value is produced by execution of the program code in step 3002. At step 3006, the output value may be used by UI control as a value setting. For example, if the UI control performs image processing and the output value reflects a certain control value for the image processing, the UI control may use the output value for the image processing. Use of the output value may help the UI element generate a particular computational result that is displayed by the UI element.

Back to FIG. 3A, in some embodiments, the first value setting may be an event that triggers process 300 to proceed to block 306 and execute UI program code. This event may, for example, notify other entities, such as other parts of code or the environment in which one or more of the UI element and first program code are contained in, that a first value setting has occurred.

In some embodiments, the event may notify the editor that a first value setting has occurred for a UI element, and trigger another process to take place. For example, the editor may listen for changes to a UI element of an application and can notify external program code to take one or more actions when the UI element changes. In some embodiments, a UI element may be configured such that it generates an event notification whenever a change, such as a first value setting, is detected. In some embodiments, the application including the UI element may itself use a listen function that listens for changes of the UI element. Examples of the listen function operation are provided below.

For example, each UI element may allow the application it is a part of to "listen" for changes that are made to each UI element, and thereby trigger process 300 to proceed to block 306 when any or a particular change is made to a UI element (and thereby "heard" by the application). The part of the application that performs the "listening" may be that which is responsible for executing UI program code. Any number of events may be listened for. For example, an event may be a change event, such as the changing of a particular UI element by setting a first value via interaction with a slider or pressing of a button. In another example, an event may be a change event, such as the changing of a particular UI element by setting a first value via other program interaction with the application that the UI element is a part of. In one example, an event may be a global change event reflecting a change to any UI element of an application. In such a case, when any UI element of an application is changed, a global change event is generated and listened to by the application, and process 300 is triggered to proceed to block 306 and execute UI program code. In another example, events may be tied to particular UI elements. In this case, particular UI elements of an application may have particular change events that are individually listened to by the application. Here, for example, if a particular UI element is changed, a change event reflecting only the change to that particular UI element is listened to by the application. A change to a particular UI element may cause triggering of process 300 to proceed to block 306 and execute UI program code. However, a change to a different UI element may not cause triggering of process 300 to proceed to block 306 and execute UI program code. In another example, a subset of UI elements of an application may have a particular change event listened to by the application. Here, if one of the subset of UI elements is changed, for example, a change event is generated and listened to by the application, and then process 300 is triggered to proceed to block 306 and execute UI program code. However, if a UI element that is not in the subset of UI elements is changed, for example, a change event is not generated and thereby not listened to by the application, and triggering of process 300 to proceed to block 306 and execute UI program code may not occur.

As shown in FIG. 3A, process 300 may include executing UI program code at block 306. In some embodiments, the execution of UI program code may be triggered by receiving the first value setting in block 304. In some embodiments, the execution of UI program code may not be triggered by receiving the first value setting in block 304, and may be triggered by some other human interaction with the UI element or by some other interaction caused by program code external to the UI element. In some embodiments, the execution may produce a first result comprising a computational result. A calculation of an equation may cause the computational result. The UI element may graphically display the computational result. The computational result may reflect an adjustment of an item graphically displayed by the UI element. In some embodiments, for example, the computational result may be caused by the first value setting that may manipulate or adjust the data or file being graphically displayed by the UI element. For example, a computational result may be caused by the first value setting that adjusts a color or viewing window of a graph, for example, and the computational result may be graphically displayed due to the varied color or viewing window of a graph displayed by the UI element, for example. In some embodiments, for example, the computational result may be caused by a first value setting that may vary brightness, blurring, color, filtering, size, and/or threshold, for example, of an image that is displayed by the UI element. The computational result may be graphically displayed due to the varied brightness, blurring, color, filtering, size, and/or thresholding, for example, of the image that is displayed by the UI element. In some embodiments, for example, the computational result may be caused by the first value setting that may apply processing to data that is displayed by the UI element. For example, the computational result may be caused by the first value setting that may apply image processing to image data that is displayed by the UI element. Image processing may be, for example, color to grayscale or grayscale to color conversion, or any other kind of processing that manipulates image data. For example, referring to FIG. 1E, the dragging of slider 132 to a value of 89 may cause execution of UI program code for application 114 (e.g., the UI element) that causes a computational result reflected by the displayed manipulated image 130. By dragging slide 132 to the value of 89, the processing of application 114 is changed, and the computational result is changed such that manipulated image 130 is output as shown in FIG. 1E. This contrasts with before slider 132 is dragged (where the value of the sensitivity is 50), and the processing of application 114 provides the computational result as shown in manipulated image 130 in FIG. 1D. For example, the runtime value of the first value setting may be changed to the set first value setting.

As shown in FIG. 3A, process 300 may include generating second code at block 308. In some embodiments, the generating of second code at block 308 may be performed based on the executing of code at block 306. For example, in some embodiments, the generating of the second code may be performed following the executing of block 306. In some embodiments, the generating of the second code may not be performed following the executing of block 306, and may be performed at some different time or at the same or substantially the same time. In some embodiments, the generating of the second code may be performed at or substantially at the executing of block 306 (e.g., at runtime of the code used in block 306). In some embodiments, the generating of the second code may be performed during the executing of block 306 (e.g., during runtime of the code used in block 306). The generated second code may comprise a code portion that, when executed, produces the computational result of block 306.

For example, in some embodiments, the second code may be generated at block 308 due to an interaction with the UI element that causes execution of code at block 306. For example, a user may interact with one or more of a slider and button of the UI element. For example, the slider may be manipulated and slid to a particular position, or the button may be pressed such that the UI program code receives a first value setting. The first value setting can reflect the interaction by the user and can be generated by one or more functions of UI control of the UI element. In another example, a first value setting may be received by the UI program code due to execution of external program code that interacts with the UI element. In some embodiments, one or more of these events may cause the generation of second code at block 308, and the generated second code may comprise a code portion that, when executed, produces the computational result of block 306. For example, the generated second code may include one or more code portions from the UI program code that, when executed, produce the computational result of block 306.

In some embodiments, the generated second code can be displayed in the environment of which the UI element is displayed. For example, the generated second code can be displayed in a region of TCE 102 such as where program code referenced by 136 in FIG. 1I is located. In some embodiments, the generated second code can be displayed in the UI element. In some embodiments, the generated second code can be displayed in a different part of the programming environment outside the UI element. In some embodiments, the generated second code can occur with or without user knowledge. In some embodiments, a user may decide whether or not to generate second code, whether to view the generated second code, insert the generated second code, or delete or change the generated second code. In some embodiments, the generated second code can be stored locally on a user's device or on a device that is external to the user's device. In some embodiments, the generated second code can be stored with UI program code, external code, or any other code that it is associated with.

The generated second code may provide computational results without another execution of the UI element. For example, the generated second code reflects the parameters that provide the same computational result as execution of the UI element. Thus, rather than executing the UI element in subsequent processes when the same computational result of the UI element is desired, the generated second code may be executed instead.

In some embodiments, the environment containing one or more of the UI program code and first program code may display the second generated code. Therefore, block 308 may be implemented at the direction of the environment including one or more of the UI program code and first program code so that the second code can be generated and displayed. The UI environment may be an editing environment, or any other kind of environment that is not necessarily an editing environment.

In some embodiments, the second code may be generated at block 308 during a saving process. For example, in some embodiments, when the environment running the UI program code and/or first program code, which in some embodiments may be run by different programs or environments, performs a saving process to save a file containing one or both of the UI program code or first program code, the process of block 308 may be performed to generate the second code.

In some embodiments, the generated second code may be associated with the first program code that it is embedded in. For example, the generated second code can execute as part of executing first program code. In some embodiments, the second generated code may be updatable. For example, due to an interaction with a UI element by a user or due to an interaction with a UI element by external other program code, one or more new values of the UI element may be set. Rather than generating new second generated code, only the value or values that were newly set may be updated within the second generated code. In another example, when such interaction occurs, the second generated code may be newly generated so a new second generated code reflecting the newly set value or values may be provided.

Figure 4:
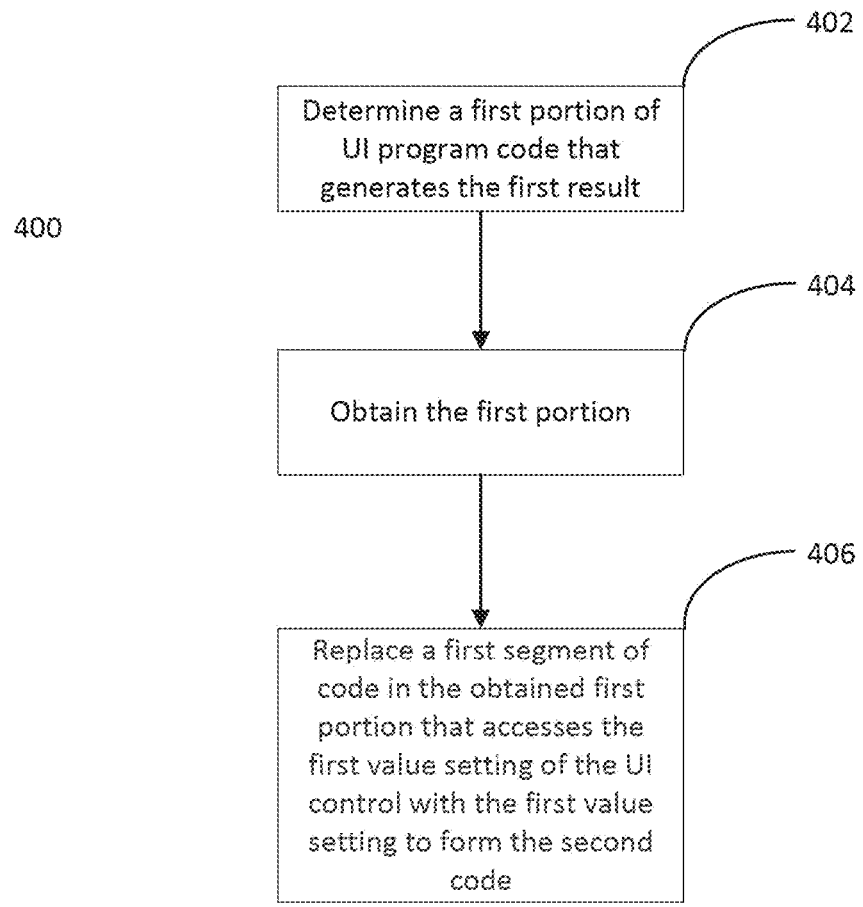
FIG. 4 is a flow chart of an example process in accordance with embodiments of the present disclosure.
Figure 5:
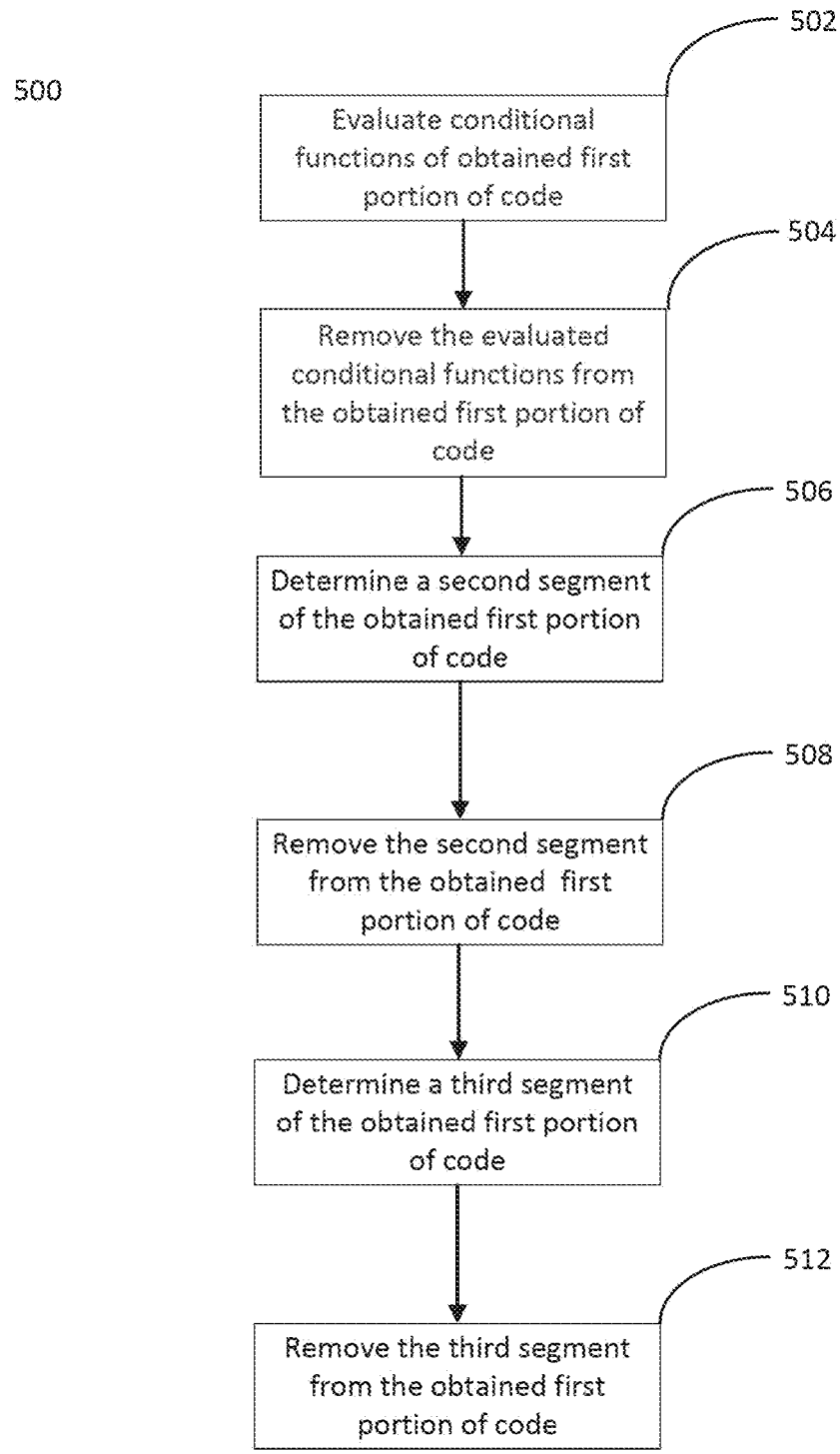
FIG. 5 is a flow chart of an example process in accordance with embodiments of the present disclosure.
Figure 6:
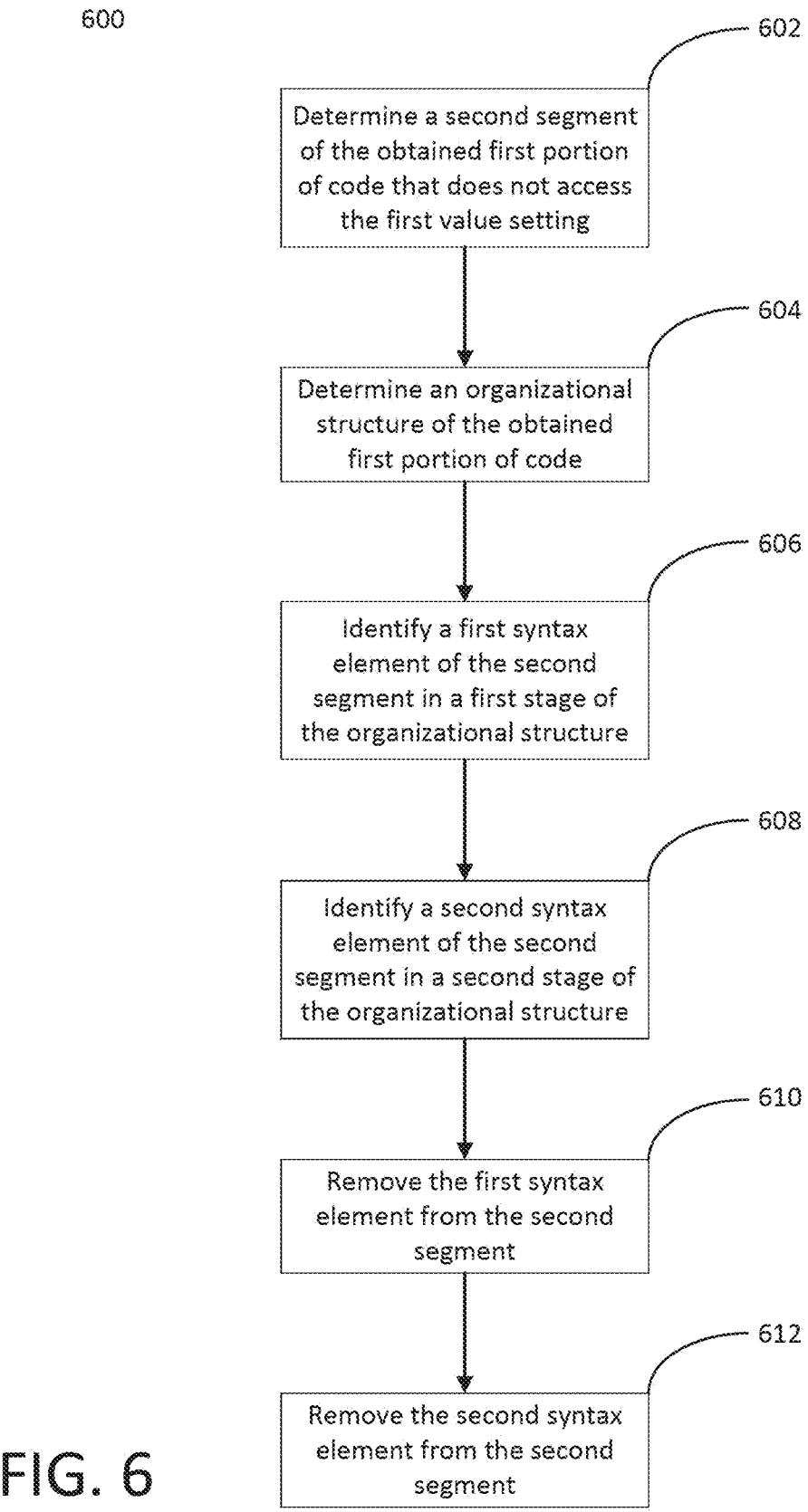
FIG. 6 is a flow chart of an example process in accordance with embodiments of the present disclosure.

FIG. 4 through FIG. 6 show various flow charts of exemplary processes in accordance with embodiments of the present disclosure that may be included in the generating of second program code in block 308 of process 300 in FIG. 3A. One or more of the exemplary processes shown in FIG. 4 through FIG. 6 may be included in the generating of second program code in block 308 of process 300 in FIG. 3A. In addition, FIGS. 8A-8F show how an exemplary obtained first portion of UI program code 700 may be used to generate the previously discussed second code. Block 308 may be performed using execution time information of the UI element and the source code of the UI element, without a preprogrammed code generator for the UI element.

FIG. 4 is a flow chart of an example process 400 in accordance with embodiments of the present disclosure. In particular, process 400 shows an exemplary process of generating second code that may take place within block 308 of process 300 in FIG. 3A. For example, process 400 may include determining a first portion of UI program code that generates the first result at block 402. This first result may be the first result produced by the execution performed in block 306 of process 300 in FIG. 3A. The first portion may include one or more functions. The one or more functions, when executed, may produce the first result as explained with respect to block 308. For example, the first portion of UI program code that generates the first result may be a portion of the UI program code that includes one or more functions that produce a computational result, such as the processing, changing, or adjustment of data or a file displayed by the UI element. The one or more functions that produce a computational result may access a value setting of UI control to provide different computational results in accordance with the accessed value setting. For example, the determined first portion of code may be UI program code 700 discussed below with respect to FIG. 7A. The processing performed in block 402 may be performed by automatic code generator 906, which is discussed below with respect to FIG. 9. For example, automatic code generator 906 may determine, from application source code 902, the first portion of UI program code that generates the first result. The first result may be a computational result displayed by the UI element produced by application source code 902.

As shown in FIG. 4, process 400 may include obtaining the first portion at block 404. In some embodiments, the determined first portion may be obtained via a copying routine that copies it to a particular area in the programming environment. For example, the obtained first portion of code may be UI program code 700 discussed below with respect to FIG. 7A. The processing performed in block 404 may be performed by automatic code generator 906, which is discussed below with respect to FIG. 9. For example, the automatic code generator 906 may obtain the first portion from application source code 902.

As shown in FIG. 4, process 400 may include replacing a first segment of code in the obtained first portion that accesses the first value setting of the UI control with the first value setting to form the second code at block 406. In some embodiments, the first segment of code may be one or more inputs to a function. In some embodiments, the function may be a function that uses a value setting of the UI control and generates computational results, such as adjusting, changing, or editing, for example, data or a file displayed by the UI element. In some embodiments, the input to the function may be used to fetch the first value setting that is received in block 304 of process 300 in FIG. 3A. For example, the input could initially be a placeholder program element, such as a fetching function or a dummy value. For example, if the placeholder is a fetching function, it fetches a set value of a UI element. For example, referring to the FIG. 1 drawings, the placeholder may be a "get slider value" function that fetches a value of the slider 132 of application 114 when the value is set. In another example, the placeholder may be a dummy value that takes the value of the set value of a UI element. In some embodiments, the result of block 406 is generated second code that include code portions of the first segment of code with an input placeholder replaced by the first value setting. In some embodiments, the result of block 406 may be the generated second code and no removal of code may take place. In some embodiments, the result of block 406 may have certain code portions removed to reduce the size of the generated second code and remove functions and/or lines of code that are not necessary to perform the particular user or external program. Moreover, by removing the certain code portions, readability of the generated second code may be improved. In some embodiments, the result of block 406 may have certain elements that are not removed because even though they may not be utilized by the particular user or external program interactions, keeping the elements in the generated code may provide for possible future interaction with them without further generation of code. For example, if a first UI element is interacted with by a user, second code may be generated. If code portions are not removed from the second generated code, portions of the code may include code for other UI elements that were not interacted with and still have their input placeholders. If one or more of these other UI elements are later interacted with, rather than generating further new reflecting the set value of the one or more other UI elements caused by the interaction, the one or more other UI elements of the original second generated code may have their input placeholder(s) replaced with the set value. This may provide further flexibility in the code generation of embodiments of the present disclosure because repeated code generation may be avoided.

The processing performed in block 406 may be performed by automatic code generator 906, which is discussed below with respect to FIG. 9. For example, the automatic code generator 906 may use an update function to recognize one or more value settings of the application source code 902, and may replace one or more placeholder inputs of the application source code with the one or more value settings.

FIG. 5 is a flow chart of an example process 500 showing exemplary streamlining of generated code accordance with embodiments of the present disclosure. As shown in FIG. 5, process 500 may include evaluating satisfied conditional functions of the obtained first portion at block 502. For example, at block 502, conditional functions that are satisfied due to one or more of user interactions with the UI element, interactions by external program code with the UI element, and/or other processes of the obtained first portion are evaluated and set to true if they are satisfied. In some embodiments, in block 502, before the first portion has been obtained, process 500 may include evaluating satisfied conditional functions of the first portion. In some embodiments, process 500 may include evaluating unsatisfied conditional functions of the obtained first portion at block 502, and determining that the conditional functions have not been met. The processing performed in block 502 may be performed by automatic code generator 906, which is discussed below with respect to FIG. 9. For example, the automatic code generator 906 may determine whether conditional functions are present in the obtained first portion of code from application source code 902, and whether the conditional functions have been satisfied or not as discussed above.

As shown in FIG. 5, process 500 may include removing the evaluated conditional functions from the obtained first portion of code at block 504. In some embodiments, the removing may include deleting the evaluated conditional functions that are true from the obtained first portion of code (e.g., that are satisfied). In some embodiments, the removing may include deleting the evaluated conditional functions that are not true from the obtained first portion of code (e.g., that are not satisfied). In some embodiments, the removing may include deleting one or more lines of code from the obtained first portion of code. In some embodiments, the removing may include deleting one or more functions from the obtained first portion of code. In some embodiments, the removing may be performed recursively such that parts of code are removed in a particular order. The processing performed in block 504 may be performed by automatic code generator 906. For example, the automatic code generator 906 may remove satisfied and/or unsatisfied conditional functions from the obtained first portion application source code 902.

As shown in FIG. 5, process 500 may include determining a second segment of the obtained first portion of code in block 506. In some embodiments, the determined second segment may be part of the first portion of code that produces graphical configurations of the UI element, such as code that graphically displays and configures the UI element itself by configuring, for example, one or more of shape of UI control elements (e.g., buttons, sliders, etc.), locations of those elements, colors of those elements, and text associated with those elements. For example, the determined second segment may be part of the first portion of code that may not be changed by the received first value setting and facilitates display of graphical elements by the UI element. For example, the determined second segment may be part of the first portion of code that does not change due to interaction by a user or from external code, and need not be generated. In some embodiments, in block 506, before the first portion has been obtained, process 500 may include determining the second segment of the first portion. The processing performed in block 506 may be performed by automatic code generator 906. For example, the automatic code generator 906 may determine part of the first portion of application source code 902 that produces graphical configurations of the UI element produced by execution of application source code 902.

As shown in FIG. 5, process 500 may include removing the second segment from the obtained first portion of code in block 508. In some embodiments, the removing may include deleting the second segment from the obtained first portion of code. In some embodiments, the removing may include deleting one or more lines of code of the second segment from the obtained first portion of code. In some embodiments, the removing may include deleting one or more functions of the second segment from the obtained first portion of code. In some embodiments, the removing may be performed recursively such that parts of code are removed in a particular order. The processing performed in block 508 may be performed by automatic code generator 906. For example, the automatic code generator 906 may remove the part of the first portion of application source code 902 that produces graphical configurations of the UI element produced by execution of application source code 902.

As shown in FIG. 5, process 500 may include determining a third segment of the obtained first portion of code in block 510. In some embodiments, the determined third segment may be part of the first portion of code that produces graphical display of the computational result. For example, the determined third segment may be part of the first portion of code that may not be changed by the received first value setting and facilitates display of the computational result by the UI element. For example, the determined third segment may be part of the first portion of code that does not change due to interaction by a user or from external code, and need not be generated. In some embodiments, in block 510, before the first portion has been obtained, process 500 may include determining the third segment of the first portion. The processing performed in block 510 may be performed by automatic code generator 906. For example, the automatic code generator 906 may determine part of the first portion of application source code 902 that produces graphical display of the UI element produced by execution of application source code 902 that provides di splay of the computational result.

As shown in FIG. 5, process 500 may include removing the third segment from the obtained first portion of code in block 512. In some embodiments, the removing may include deleting the third segment from the obtained first portion of code. In some embodiments, the removing may include deleting one or more lines of code of the third segment from the obtained first portion of code. In some embodiments, the removing may include deleting one or more functions of the third segment from the obtained first portion of code. In some embodiments, the removing may be performed recursively such that parts of code are removed in a particular order. The processing performed in block 512 may be performed by automatic code generator 906. For example, the automatic code generator 906 may remove the part of the first portion of application source code 902 that produces graphical display of the UI element produced by execution of application source code 902 that provides display of the computational result.

FIG. 6 is a flow chart of an example process 600 in accordance with embodiments of the present disclosure. The processing performed in process 600 may be performed by automatic code generator 906. As shown in FIG. 6, process 600 may include determining a second segment of the obtained first portion of code that does not access the first value setting in block 602. In some embodiments, the second segment of the first portion of code that does not access the first value setting may be part of the first portion of code that produces graphical configurations of the UI element as discussed with respect to block 502 of process 500. In some embodiments, the second segment of the first portion of code that does not access the first value setting may be part of the first portion of code that produces graphical display of the computational result as discussed with respect to block 506 of process 500. For example, the determined second segment may be part of the first portion of code that does not change due to interaction by a user or from external code, and need not be generated. In some embodiments, in block 602, before the first portion has been obtained, process 600 may include determining the second segment of the first portion.

As shown in FIG. 6, process 600 may include determining an organizational structure of the obtained first portion of code in block 604. In some embodiments, the organizational structure can be a tree structure, such as a parse tree, for example. In some embodiments, the organizational structure can be a chart or a table, for example. In some embodiments, the organizational structure can be a list, for example. In some embodiments, the organizational structure can be a flow diagram. In some embodiments, the organizational structure may be a marking structure that marks the first portion of code within the UI program code before obtaining the first portion of code, and then obtains the first portion of code. In some embodiments, the determining of the organizational structure may be performed on the first portion of code rather than the obtained first portion of code. In some embodiments, the organizational structure can include one or more stages. For example, in some embodiments, the organizational structure can include a first stage and a second stage. Certain parts of the first portion of code can belong to the first stage, while other parts of the first portion of code can belong to the second stage. For example, the first stage may include one or more lines of code from the first portion, and the second stage may include one or more other lines of code from the first portion. For example, the first stage may include one or more functions from the first portion, and the second stage may include one or more other functions from the first portion. It should be noted that disclosure of this paragraph is applicable to both the obtained first portion of code or the first portion of code before it has been obtained.

In some embodiments, the organizational structure may include a plurality of hierarchical nodes. For example, the plurality of hierarchical nodes may belong to one of the first stage and the second stage. In some embodiments, the first stage may include a lower hierarchical node relative to the second stage. In some embodiments, the second stage may include a lower hierarchical node relative to the first stage. In some embodiments one of the first stage and second stage included the same hierarchical node or nodes.

As shown in FIG. 6, process 600 may include identifying a first element of the second segment in the first stage of the organizational structure in block 606. The first element may be, for example, a function, a line of code, or the like.

As shown in FIG. 6, process 600 may include identifying a second element of the second segment in a second stage of the organizational structure in block 608. The second element may be, for example, a function, a line of code, or the like.

As shown in FIG. 6, process 600 may include removing the first element from the second segment of the obtained first portion of code in block 610. In some embodiments, the removing may include deleting the first element from the second segment of the obtained first portion of code. In some embodiments, the removing of the first element may include deleting one or more lines of code of the second segment of the obtained first portion of code. In some embodiments, the removing of the first element may include deleting one or more functions of the second segment of the obtained first portion of code. In some embodiments, the removing may be performed recursively such that parts of code are removed in a particular order.

As shown in FIG. 6, process 600 may include removing the second element from the second segment of the obtained first portion of code in block 612. In some embodiments, the removing may include deleting the second element from the second segment of the obtained first portion of code. In some embodiments, the removing of the second element may include deleting one or more lines of code of the second segment of the obtained first portion of code. In some embodiments, the removing of the second element may include deleting one or more functions of the second segment of the obtained first portion of code. In some embodiments, the removing may be performed recursively such that parts of code are removed in a particular order.

The removing of blocks 610 and 612 may take place in any order or at the same or substantially the same time. For example, in some embodiments, block 610 may be performed before block 612, such that the first element is removed before the second element is removed. In some embodiments, block 612 may be performed before block 610, such that the second element is removed before the first element is removed. In some embodiments, block 610 and block 612 may be performed at the same or substantially the same time, such that the first element and the second element are removed at the same or substantially the same time.

FIG. 7A shows an exemplary obtained first portion of UI program code 700. This exemplary obtained first portion of UI program code may be the same as that determined and obtained in blocks 402 and 404 of process 400. As shown in FIG. 7A, the first portion includes functions in regions 702, 704, and 706. For example, the function in region 702 may reflect an image reading function, the function in region 704 may reflect an image processing function that converts a read image to gray scale, and the function in region 706 may reflect a thresholding function for a manually set threshold. In some embodiments, the manually set threshold may be the first value setting.

Figure 7B:
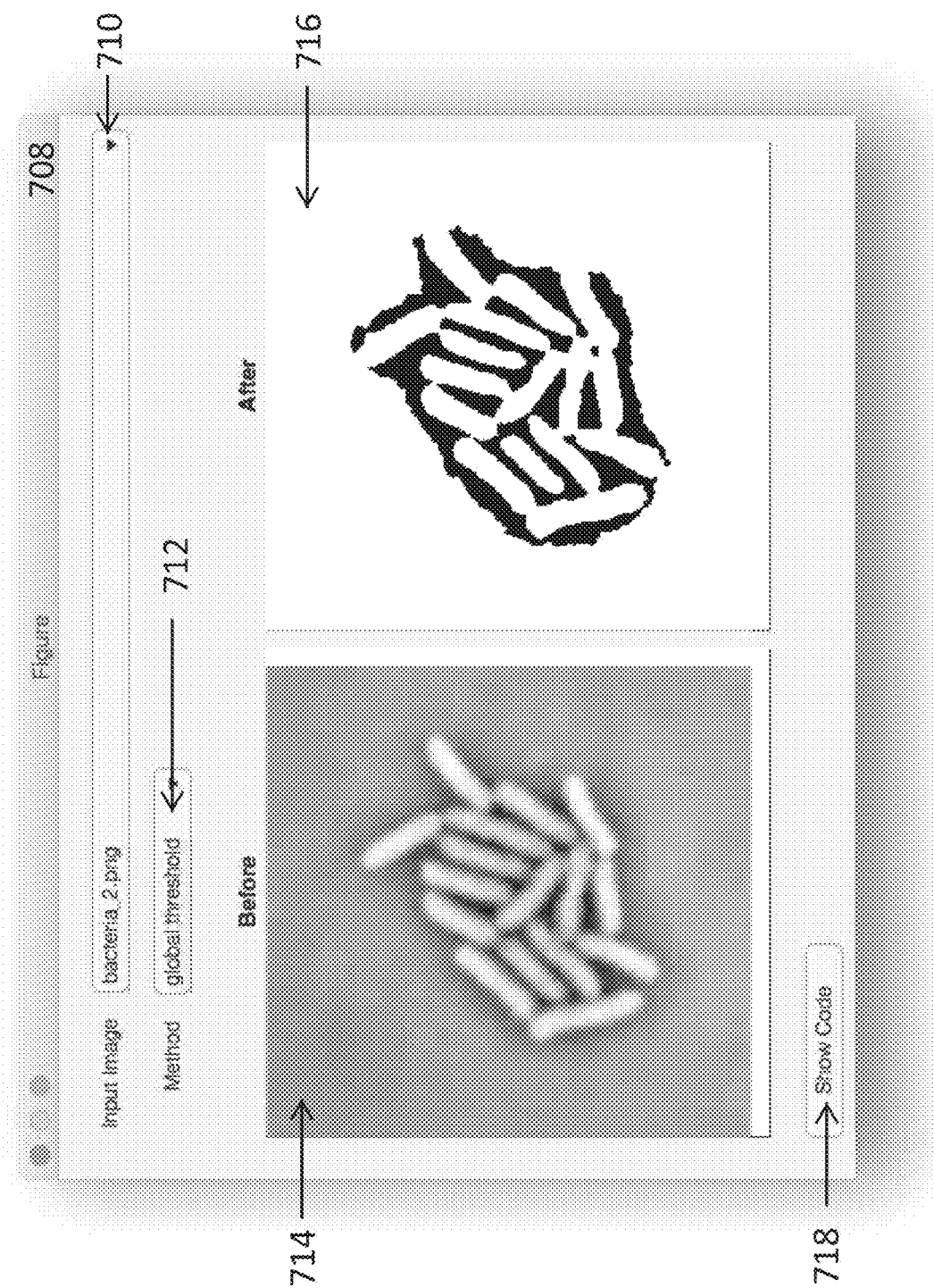

FIG. 7B shows a UI element 708 that may be generated by execution of first portion of UI program code 700. UI element 708 may include a menu 710 which may allow for selection of a file for processing by UI element 708. For example, menu 710 may be a drop-down menu that allows for selection of a particular image file for processing by UI element 708. In the example shown in FIG. 7B, menu 710 shows a selection of an input image titled "bacteria_2.png." UI element 708 may include a menu 712. For example, menu 712 may be a drop-down menu that allows for selection of a particular processing method associated with UI element 708. In the example shown in FIG. 7B, menu 712 shows selection of a of a "global threshold" method of processing.

UI element 708 may include regions 714 and 716. For example, region 714 may display an input image selected via interaction with menu 710 before the image has been processed by a processing method associated with UI element 708. For example, region 716 may display the computational result for processing the image displayed in region 714. Item 718 may be interacted with to show generated code that is executed to produce a computational result reflected in region 716.

Figure 7C:
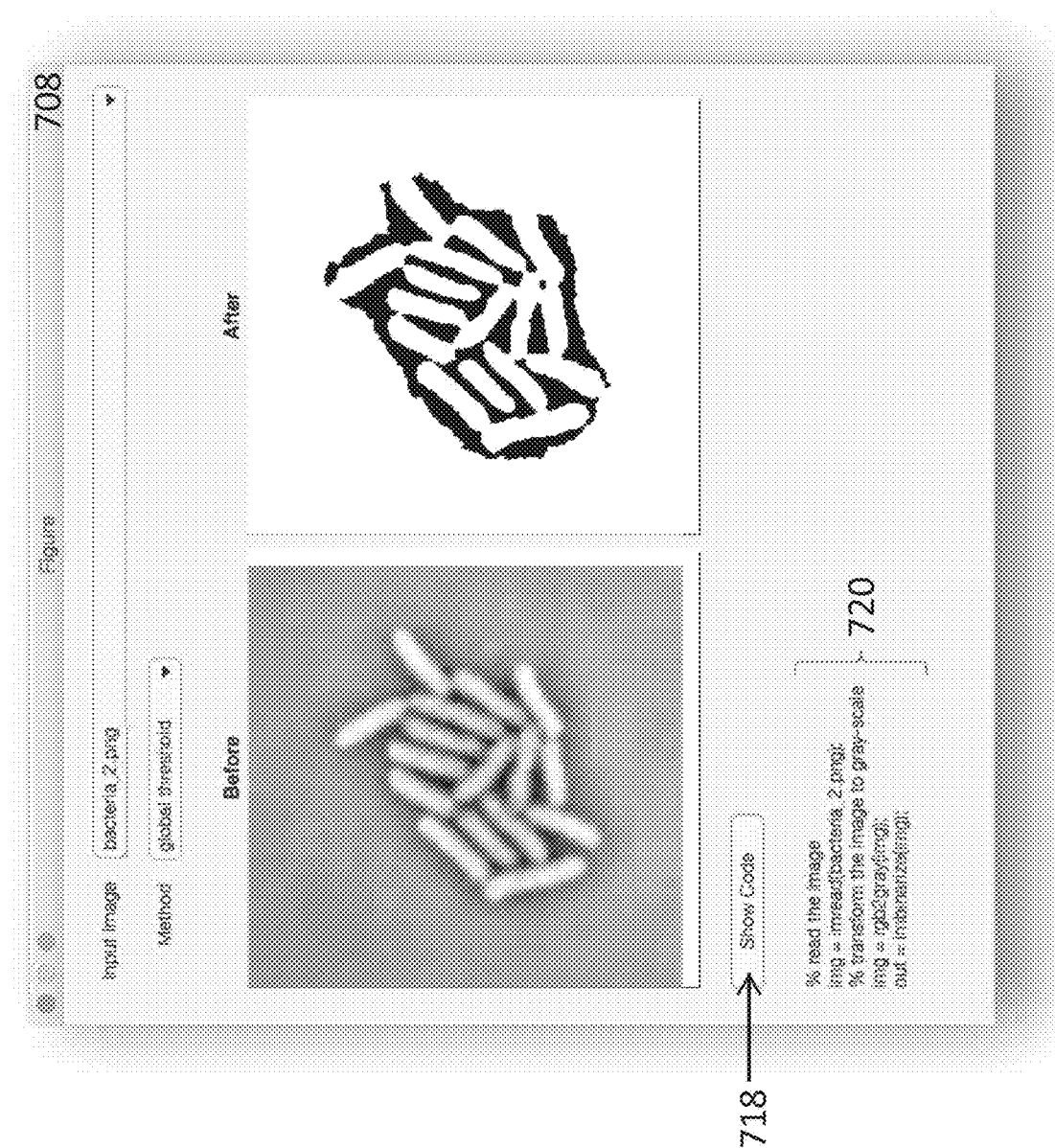

FIG. 7C shows UI element 708, where item 718 has been interacted with to display generated code 720. Generated code 720 may include parts of the obtained first portion of UI program code 700, and may be compressed code that has parts of the first portion of UI program code 700 removed. For example, generated code 720 may be the second code as discussed in this disclosure.

Figure 7D:
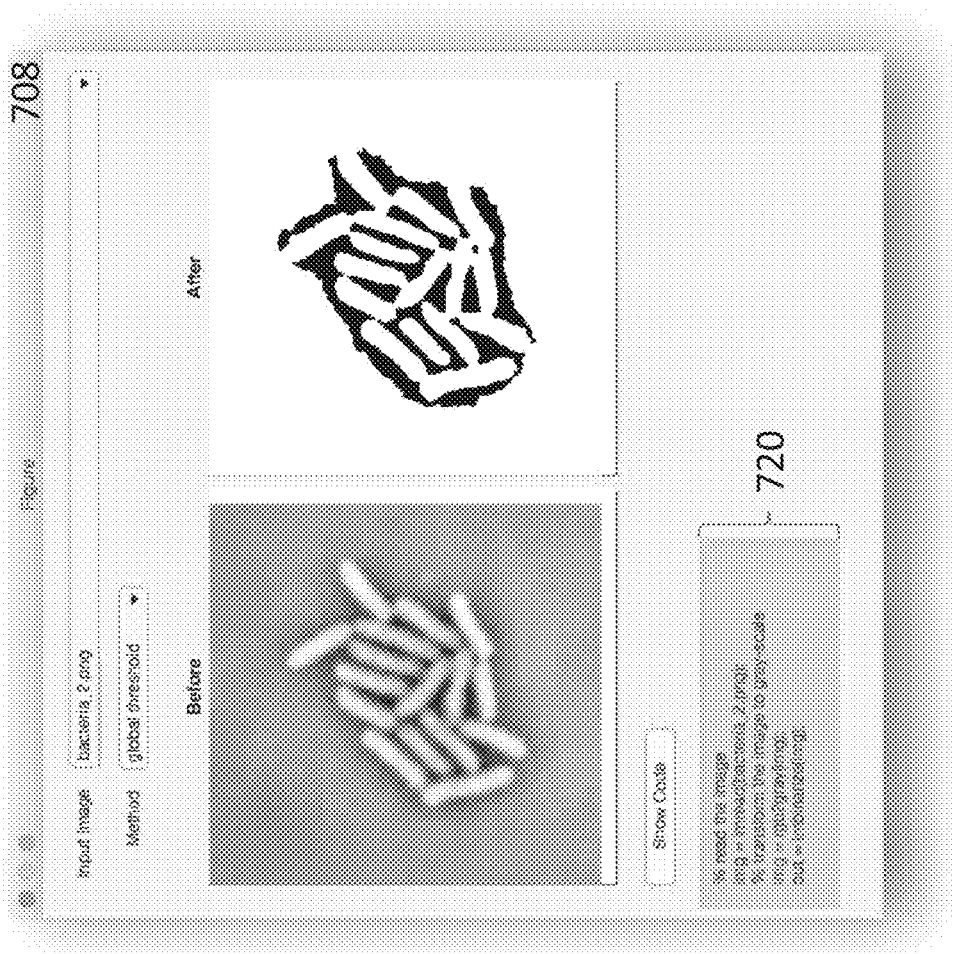

FIG. 7D shows UI element 708 along with the exemplary obtained first portion of UI program code 700. As shown, the functions in regions 702, 704, and 724 of code 700 are included in generated code 720, while the other parts of code 700 are removed.

Figure 7E:
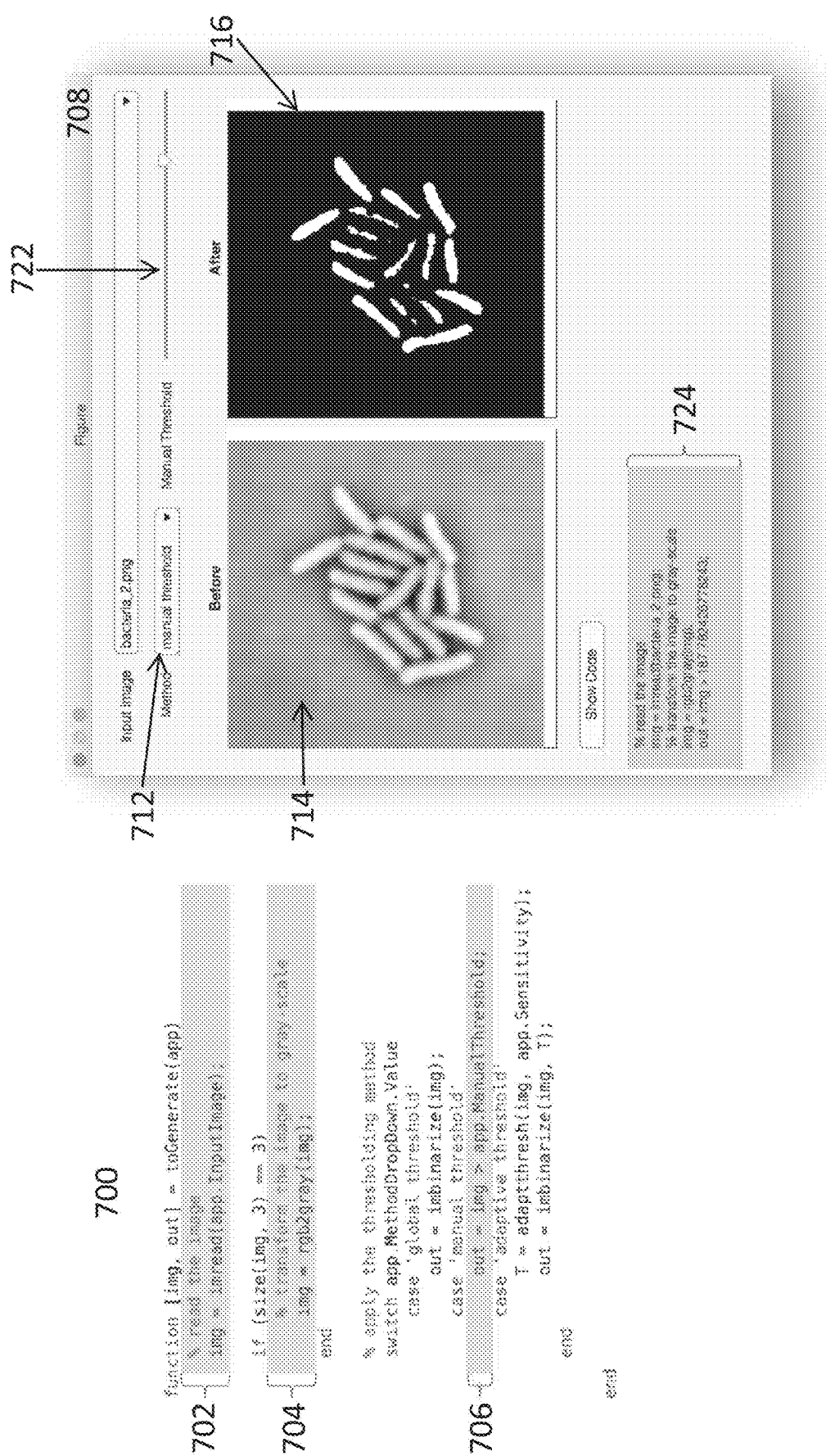

FIG. 7E shows an example of UI element 708 where menu 712 has been interacted with such that a processing method that differs to that of FIG. 7B is used. For example, menu 712 in FIG. 7E shows that a "manual threshold" processing has been selected. This selection may cause a graphical element, such as slider 722, to be displayed in UI element 708. Slider 722 may be interacted with to adjust the computational result that UI element 708 produces. For example, FIG. 7E shows region 714 displaying an input image selected via interaction with menu 710 before the image has been processed by a processing method associated with UI element 708, and region 716 displaying the computational result for processing the image displayed in region 714, where the computational result is controlled by interaction with slider 722. Slider 722 may be interacted with by dragging it to the left or the right to change the computational result that UI element produces.

Furthermore, FIG. 7E shows exemplary obtained first portion of UI program code 700. As shown, the functions in regions 702, 704, and 706 of code 700 are included in generated code 724, while the other parts of code 700 are removed. Generated code 724 is different from generated code 720 because interaction with menu 712 and slider 722 changed the processing performed by UI element 708 in FIG. 7E compared to that performed by UI element 708 in FIG. 7D. For example, generated code 724 may be the second code as discussed in this disclosure.

FIGS. 8A-8F show how the exemplary obtained first portion of UI program code 700 of FIG. 7A may be used to generate the previously discussed second code. As discussed with respect to FIGS. 7C-7E, the generated code 720 and 724 may be this second code. The examples of FIGS. 8A-8F reflect processes that may occur, for example, in the generating of second code in block 308 of process 300 in FIG. 3A.

Figure 8A:
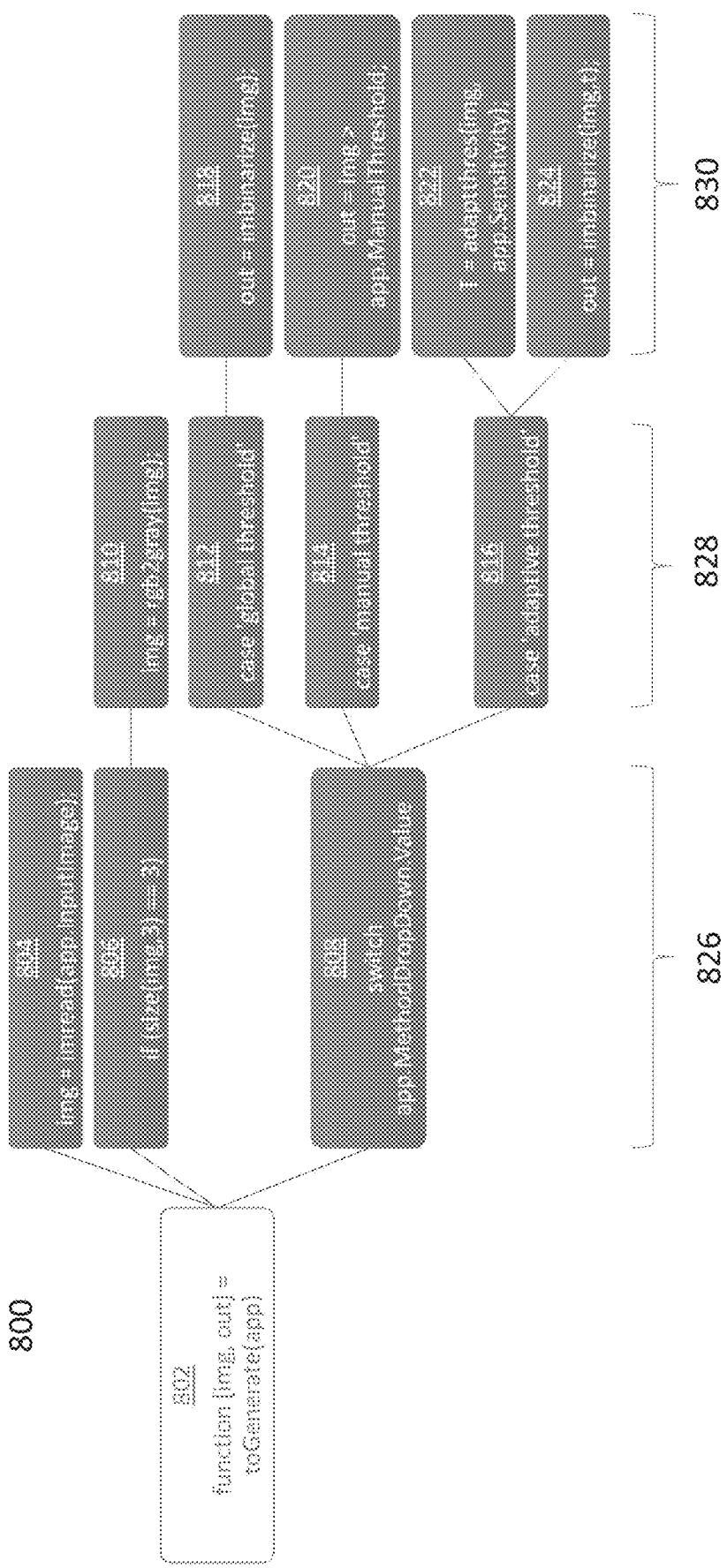
FIGS. 8A-8F are diagrams showing an exemplary process accordance with embodiments of the present disclosure.

FIG. 8A shows an organizational structure 800 of obtained first portion of UI program code 700. For example, the obtained code may be obtained as discussed with respect to block 404 of FIG. 4. As shown by FIG. 8A, the organizational structure may have a tree structure. The tree structure may be a parse tree structure, for example. The organizational structure 800 includes the code of the obtained first portion 700 located in various nodes 802 to 830. In FIG. 8A, the obtained first portion 700 reflects an exemplary function 802, which is the function "[img, out]=toGenerate (app)." This function is formed by the functions of nodes 804 to 824. For example, the structure 800 includes an image reading function ("img=imread(app.InputImage)") at node 804, which may load an image for processing into the UI element. Node 804 includes a conditional function "if(size (img, 3)==3)", which is a conditional "if" statement function. The function of node 804 is reflected in region 702 of FIG. 7A. The function of node 806 analyzes the size of the loaded image in node 804. If the "if" statement of node 806 is satisfied, the function of node 810 may be performed. Node 810 includes the functions "img=rgb2gray(img)," which performs conversion of the loaded image in node 804 to grayscale. The function of node 810 is performed if the conditional function in node 808 is satisfied. The function of node 810 is reflected in region 704 in FIG. 7A.

Node 808 includes "switch app.MethodDropDown .Value." This function reflects whether a global threshold, shown in node 812, manual threshold, shown in node 814, or adaptive threshold, shown in node 816, will be applied to the image loaded in node 804.

Node 812 reflects a situation where a global threshold is set. Node 814 reflects a situation where a manual threshold is set. This manual setting may be caused by a first setting value by a user interacting with the UI element via one or more of a slider or button, for example, or first value setting by external code as described above with respect to FIGS. 1D-1J. Node 816 reflects a situation where an adaptive threshold is used in function 802. The adaptive threshold may not use a setting value from a user interaction.

Node 818 includes the function "out=imbinarize(img)," which is a binarizing function that may be applied to the image loaded in node 804. Node 820 includes the function "out=img>app.ManualThreshold." This function outputs the image loaded in node 804 with image processing applied such that the output image is larger than a threshold manually set in node 814. The function of node 820 reflects the region 706 in FIG. 7A. Node 822 includes the function "T=adaptthres(img, app.Sensitivity)." This function applies the adaptive threshold of node 816 to the image loaded in node 804. Node 824 includes the function "out=imbinarize (img, t)," which is a binarizing function that may be applied to the image loaded in node 804 using the adaptive threshold value T obtained in node 822. When node 816 is satisfied, one or both of the processing in nodes 822 and 824 may occur.

The organizational structure 800 may include a first stage 826, second stage 828, and third stage 830. As shown by FIG. 8A, the first stage 826 may include nodes 804, 806, and 808. The second stage 828 may include nodes 810, 812, 814, and 816, while the third stage 830 may include nodes 818, 820, 822, and 824, for example. The first, second, and third stages 826, 828, and 830 may be hierarchically ranked. For example, the first stage 826 may have a higher hierarchy compared to second stage 828, and second stage 828 may have a higher hierarchy compared to third stage 830. The nodes may include one or more elements. The elements may be, for example, functions, lines of code, or any other structural element of code.

Figure 8B:
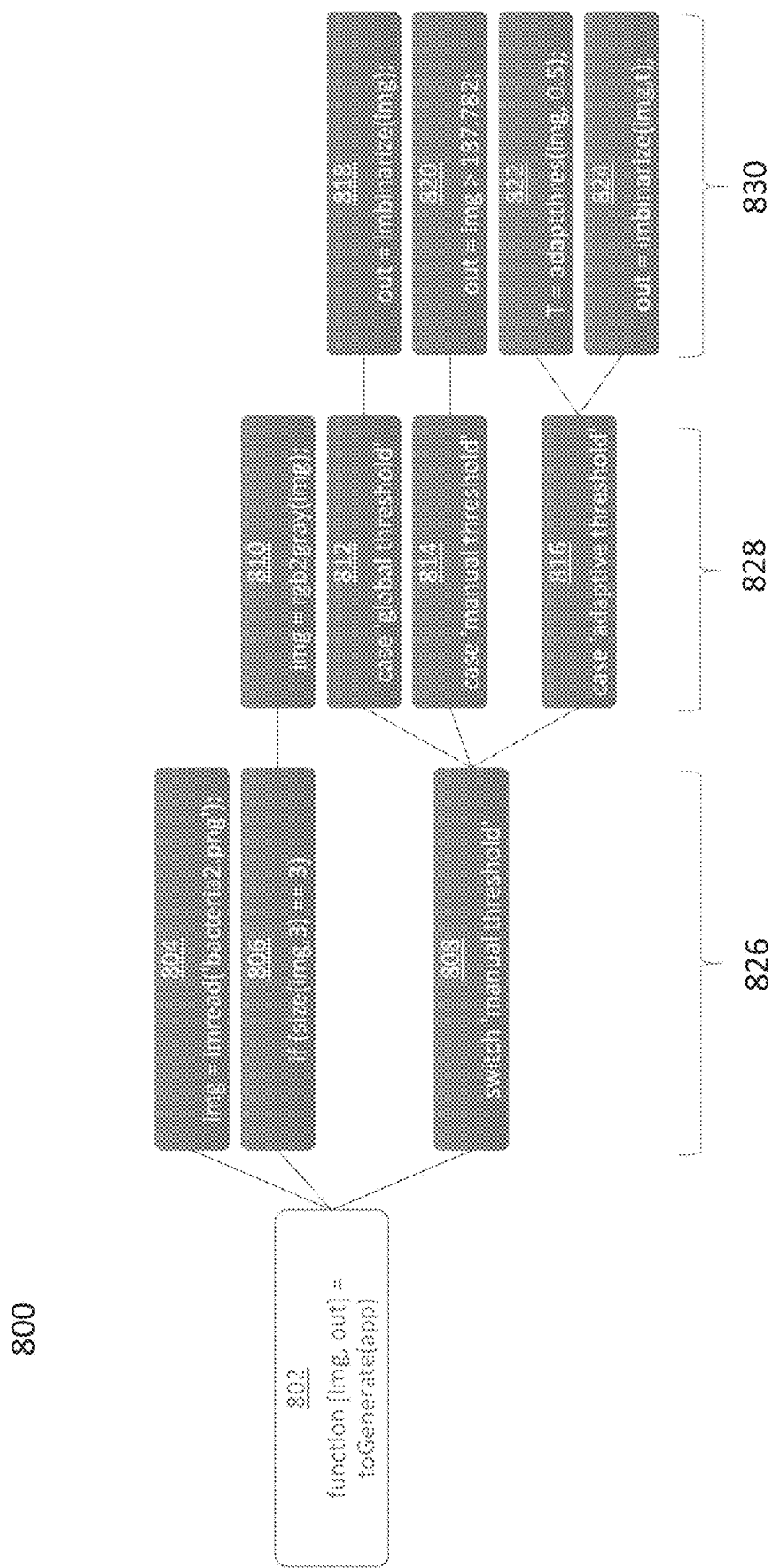

FIG. 8B shows organizational structure 800 of the obtained first portion in which an image has been uploaded. Here, an image "bacteria2.png" has been loaded into the function "img=imread(app.InputImage)" in node 804. The image loading may be performed as discussed above with respect to FIG. 1A. In node 808, the "manual threshold" setting is made, indicating that manual thresholding will be applied to the "bacteria2.png" image. Moreover, a manual threshold of 187.782 is set in node 822. The manual threshold may be set as discussed with respect to FIGS. 8A and 1D-1J above. It should also be noted at an app.Sensitivity value in node 824 is set to 0.5. However, since adaptive thresholding of node 816 is not used in this example, the adaptive thresholding using the 0.5 value is not used. For example, when settings of values are made, values of structure 800 may be replaced as described by block 406 of process 400.

Figure 8C:
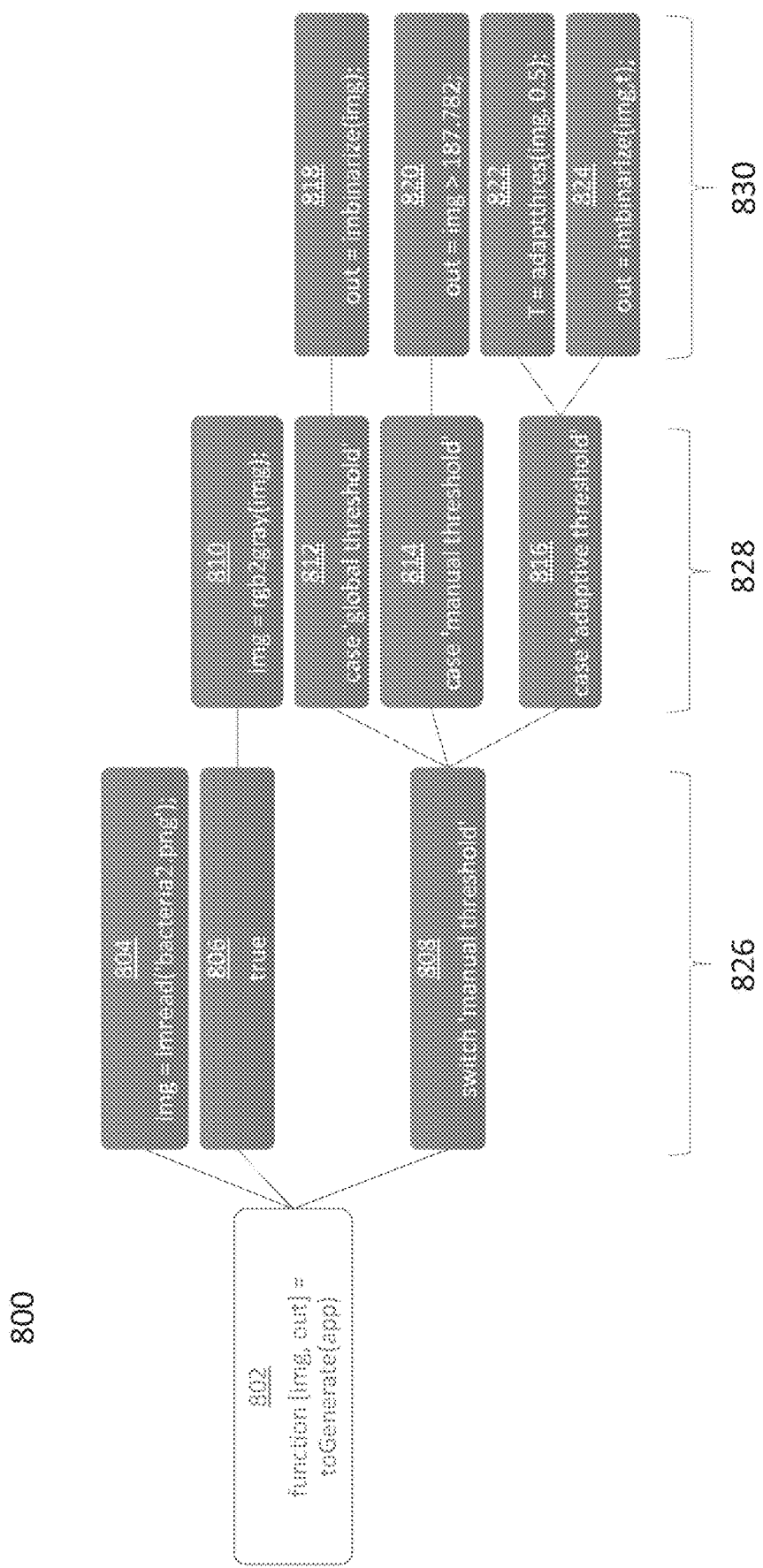

In FIG. 8C, the conditional if statement of node 806 is determined as satisfied. Thus, the value of the conditional statement in node 806 is changed to reflect "true." For example, this may be performed as discussed with respect to block 502 of process 500.

Figure 8D:
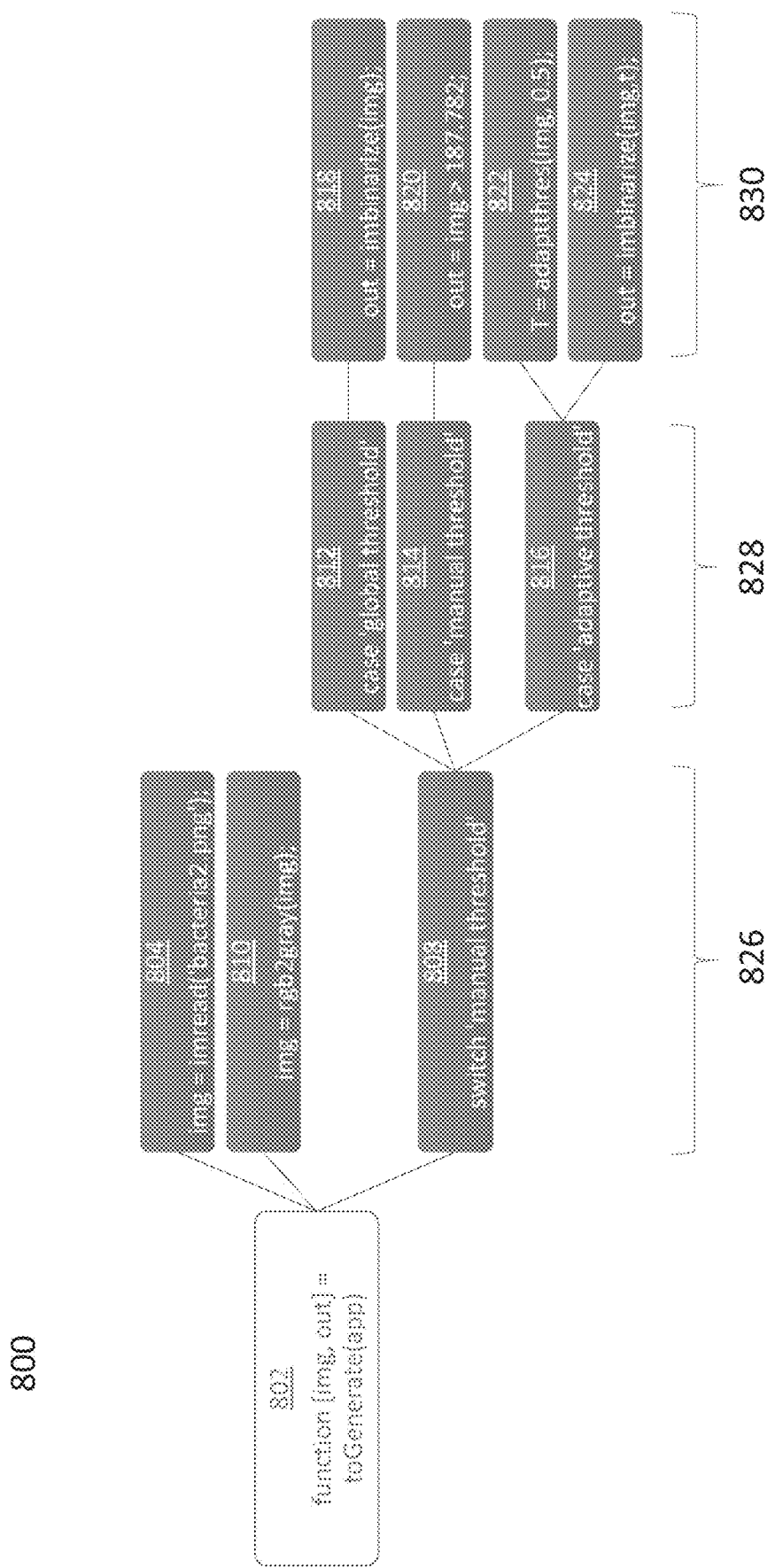

In FIG. 8D, node 806, including its true conditional statement, is removed. For example, this may be performed as discussed with respect to block 504 of process 500. Node 806 is removed from the first stage 826. Node 810, which depends on node 806, is moved to the place of node 810 in first stage 826. It should be noted that the removal of nodes (and therefore removal of code from obtained first portion of UI program code 700) need not occur. For example, the generated second code may be in the form of FIG. 8C, where no removal of nodes has occurred.

Figure 8E:
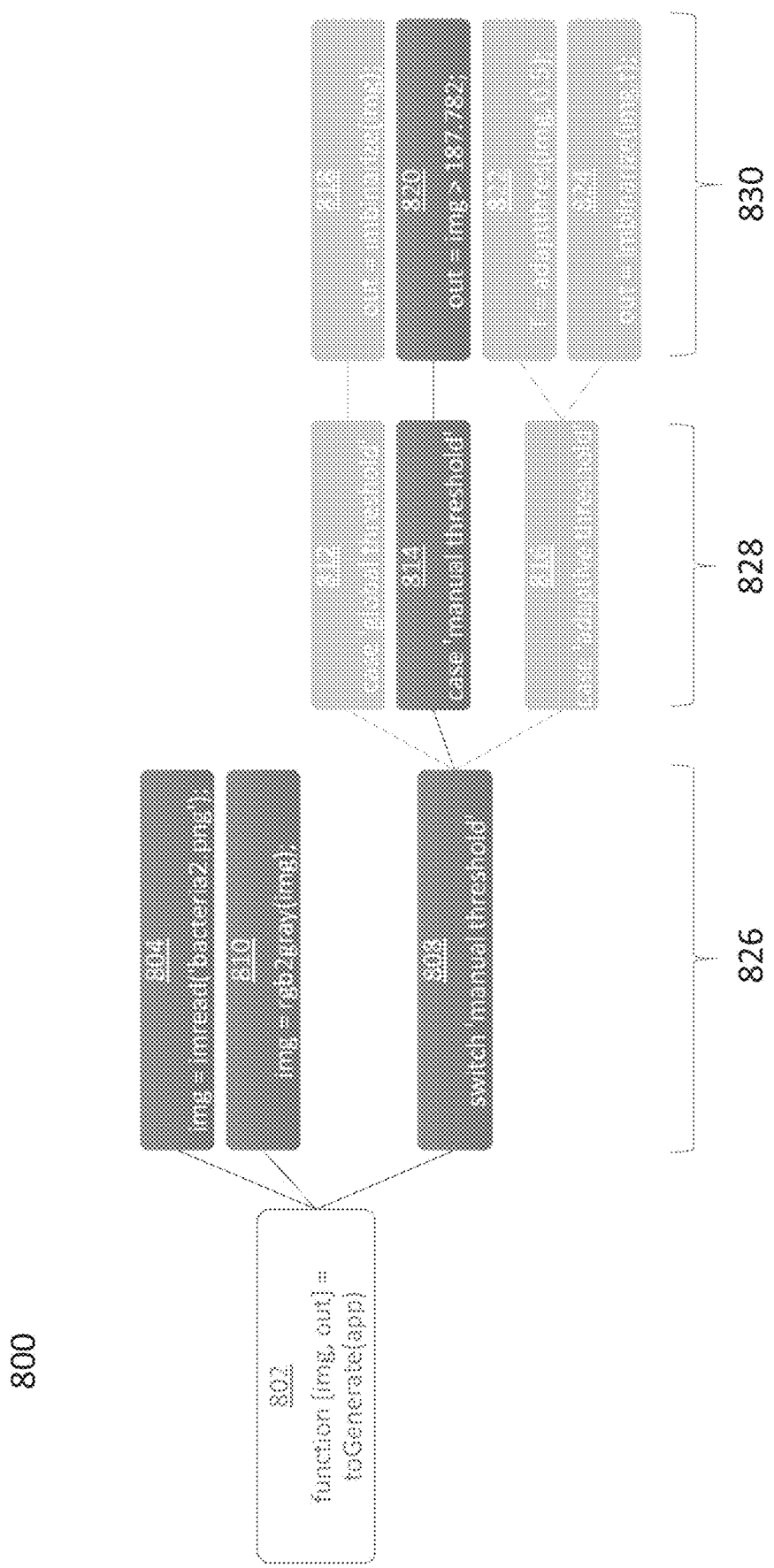

In FIG. 8E, nodes 812, 818, 816, 822, and 824 are grayed out to indicate that these nodes are removed from organizational structure 802, and thereby removed from the obtained first portion of UI program code 700. These nodes are removed because in node 808, the "manual threshold" setting is made, indicating that manual thresholding will be applied to the "bacteria2.png" image. This means that the "global threshold" and "adaptive threshold" processes of nodes 812 and 816, and their dependent nodes, will not be used to process the image loaded in node 804. Moreover, the functions of nodes 808, 814, and 820 can be collapsed to first stage 826, such that nodes 808 and 814 are removed, and only node 820 exists in node 826. This is reflected in FIG. 8F. In some embodiments, a node may be removed from the first stage 826 after removing a node from the second stage 828. In some embodiments, a node may be removed from the second stage 828 before removing a node from the first stage 826.

Figure 8F:
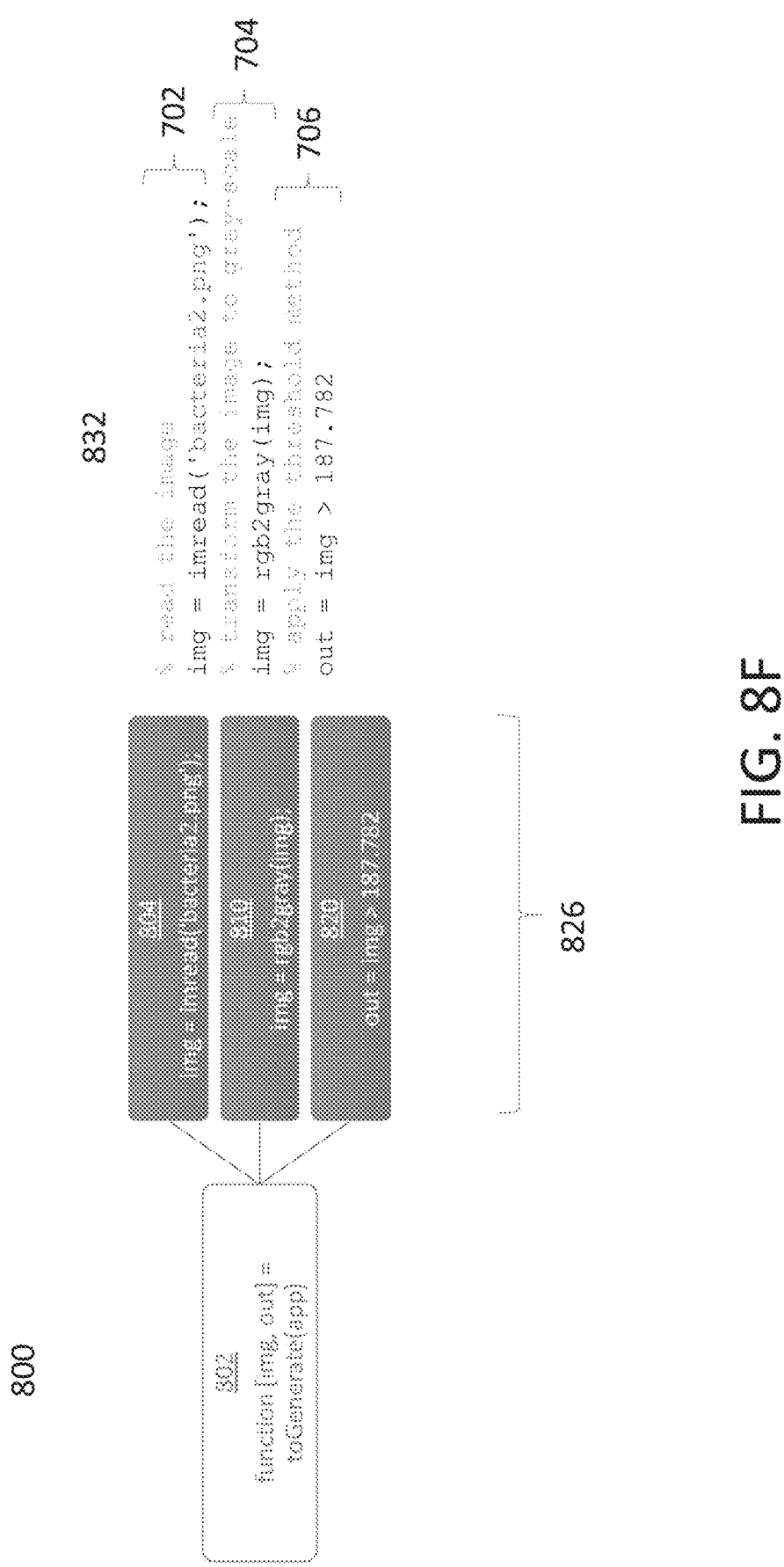

FIG. 8F shows organizational structure 800 after node removal has occurred. Here, only nodes 804, 810, and 820 remain. The generated second code 832 reflected by structure 800 performs the functions of nodes 804, 810, and 820 that are included in function 802. The generated second code 832 is compressed because nodes have been removed, meaning that lines of code corresponding to the removed node have been removed. For example, generated second code 832 only includes code that existed in regions 702, 704, and 706 from the obtained first portion of UI program code 700 shown in FIG. 7A.

Figure 9:
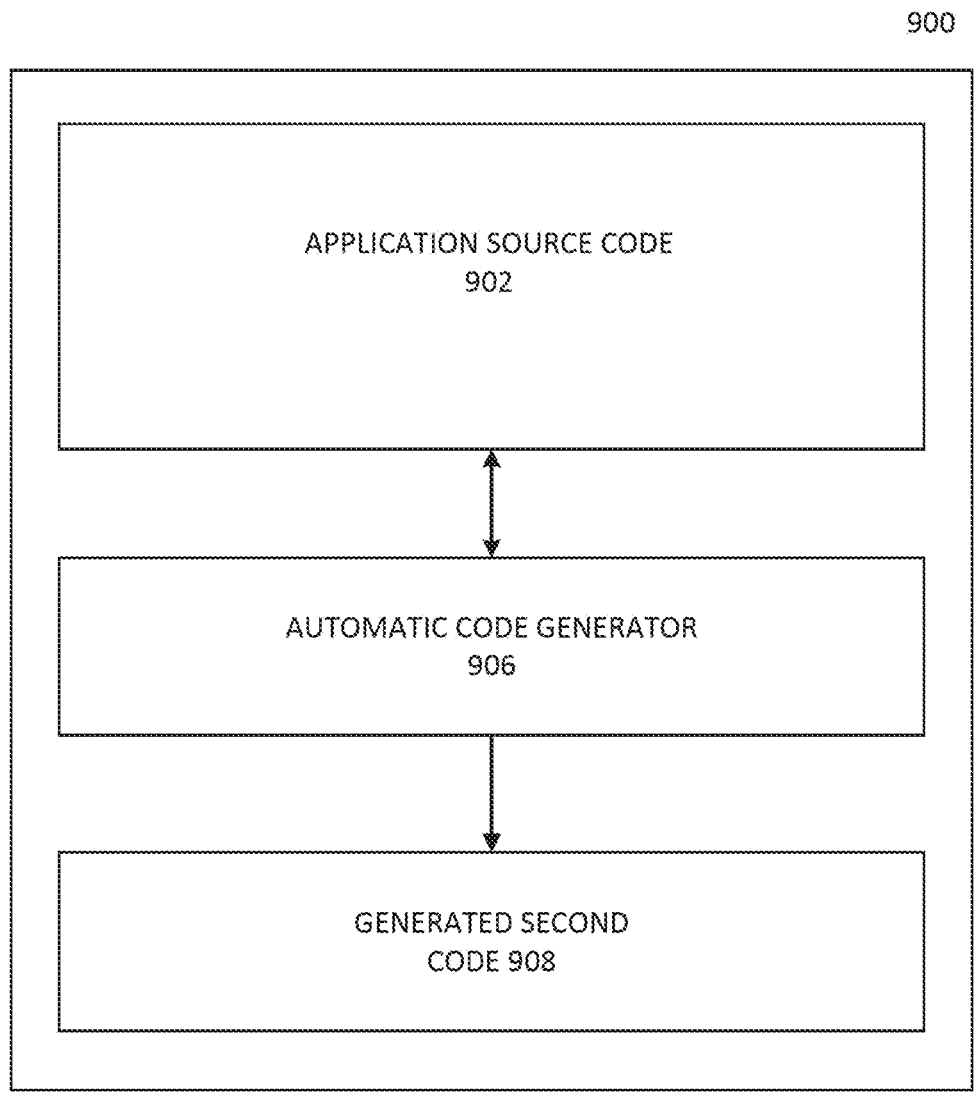
FIG. 9 is a diagram showing exemplary parts of software in accordance with embodiments of the present disclosure.

FIG. 9 is an exemplary diagram 900 showing exemplary parts 902, 906, and 908 of software in accordance with embodiments of the present disclosure. For example, diagram 900 includes application source code 902. Execution of application source code 902 may provide an application, such as application 114 shown in the drawings of FIG. 1. Execution of application source code 902 may also provide elements of the application such as the UI elements (e.g., buttons, sliders, etc.).

An update function may be part of application source code 902. The update function may include, for example, code that reflects placeholders or dummy variables that are present in functions of application source code 902. For example, as noted previously, if the placeholder is a fetching function, it fetches a set value of a UI element. For example, referring to the FIG. 1 drawings, the placeholder may be a "get slider value" function that fetches a value of the slider 132 of application 114 when the value is set. In another example, the placeholder may be a dummy value that takes the value of the set value of a UI element.

Diagram 900 also includes automatic code generator 906 and generated second code 908. Automatic code generator 906 may be code that determines application source code that has been updated by an update function and produces generated second code 908 in accordance with the disclosure provided herein. For example, updating of the application source code 902 by an update function (e.g., due to user or external other program interaction with a UI element of an application provided by application source code 902) may trigger automatic code generator 906 to generate generated code 908. Generated second code 908 may be generated second code 832 discussed above, generated second code resulting from processing in block 406 of FIG. 4, or code 136 discussed with respect to FIGS. 1I and 1K, for example.

Figure 10:
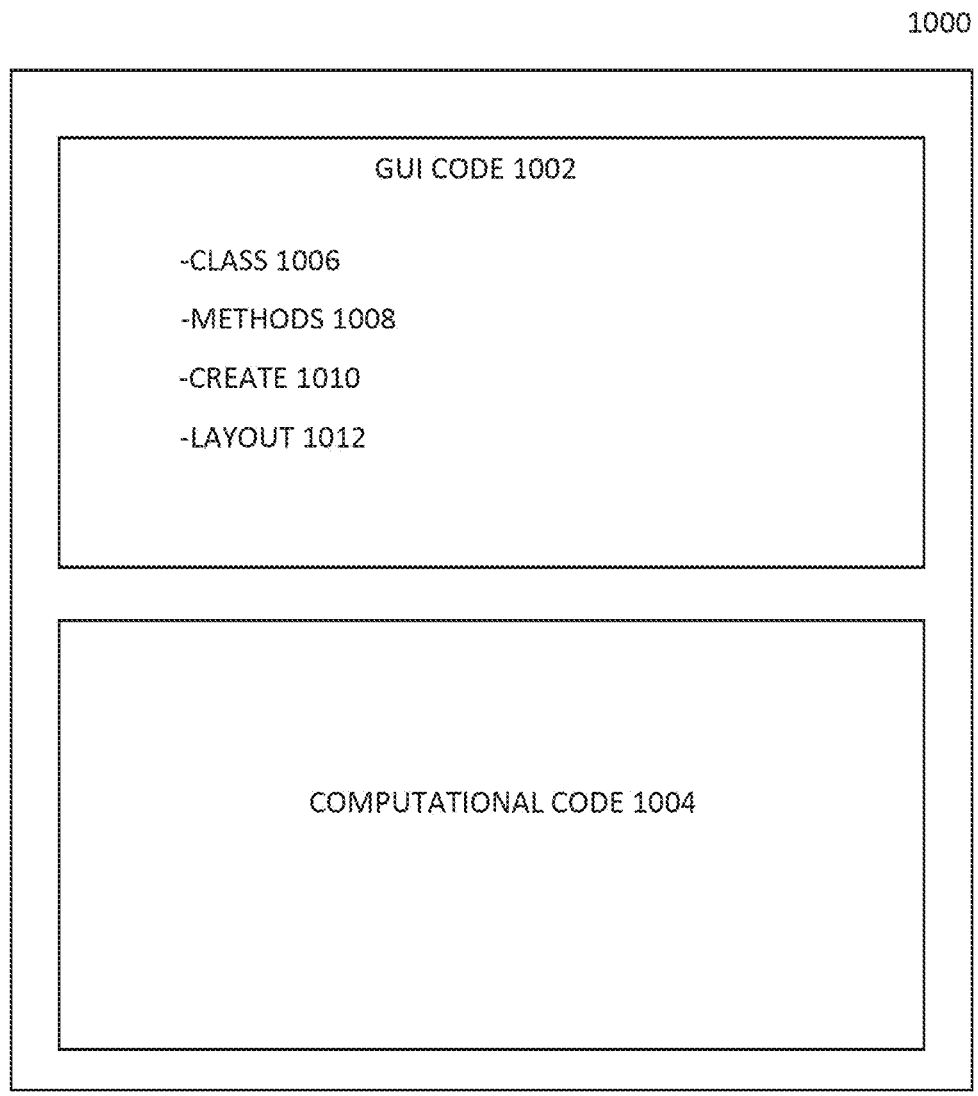
FIG. 10 shows a schematic view of source code showing exemplary parts of software in accordance with embodiments of the present disclosure.

FIG. 10 shows a schematic view of source code 1000 of a UI element (or application) in accordance with embodiments of the present disclosure. The source code 1000 may include GUI code 1002 and Computational code 1004. GUI code 1002 may be code that provides the graphical layout and graphical features of the UI element. For example, the GUI code may include various methods that provide functionality of the UI element GUI. For example, a class 1006 for the entire UI element or the UI element GUI. Methods 1008 defined for the class 1006. Create 1010 may be provided as one of the methods 1008 to create graphical components of the UI element GUI, such as sliders and/or buttons. Layout 1012 may be provided as another one of the methods 1008 or one feature of the create 1010 to adjust the graphical layout of the UI element GUI. For example, layout 1012 may specify where elements such as sliders and/or buttons are placed in the GUI of the UI element, as well as where computational results of the UI element are displayed. "Class," "Methods," "Create," and "Layout," as shown in FIG. 10, are for illustrative purposes. To provide the same functionalities, different names (such as methods shown in FIG. 10) can be used or the code can be structured differently. In other situations, the GUI code may have fewer or more types (e.g., listed by names in FIG. 10) of code than described and shown in FIG. 10, or can be structured differently.

Computational code 1004 may include elements that perform computations to determine the computational result of the UI element. For example, the computations may be calculations that perform image processing or manipulation to input image data, for example.

It should be noted that the GUI code 1002 and computational code 1004 may not be separated as shown in FIG. 10 and may be separated in any multitude of different ways. Moreover, more than one update function may be included in the source code rather than a single update function.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A non-transitory computer-readable medium storing executable instructions that, when executed by a processor, cause the processor to:
   receive a value setting via a user interface associated with a first program code; and
   generate a second program code that, when executed, produces a computational result, wherein, to generate the second program code, the instructions, when executed by the processor, cause the processor to:
      obtain a portion of the first program code that, when executed with the value setting, generates the computational result;
      determine an organizational structure of the portion, the organizational structure including a plurality of stages;
      determine, in one or more of the plurality of stages, a first segment of code that accesses the value setting and a second segment of code that does not access the value setting; and
      replace the first segment with the value setting.

2. The non-transitory computer-readable medium of claim 1, wherein, to generate the second program code, the instructions, when executed by the processor, further cause the processor to:
   determine, in the one or more of the plurality of stages, a third segment of code that produces a graphical configuration of the user interface; and
   remove the third segment from the one or more of the plurality of stages.

3. The non-transitory computer-readable medium of claim 1, wherein, to generate the second program code, the instructions, when executed by the processor, further cause the processor to:

determine, in the one or more of the plurality of stages, a third segment of code that produces a graphical display of the computational result; and remove the third segment from the one or more of the plurality of stages.

4. The non-transitory computer-readable medium of claim 1, wherein, to generate the second program code, the instructions, when executed by the processor, further cause the processor to:

remove the second segment from the one or more of the plurality of stages.

5. The non-transitory computer-readable medium of claim 4, wherein, to remove the second segment of code, the instructions, when executed by the processor, cause the processor to:

determine a first stage and a second stage in the plurality of stages;

identify a first element of the second segment located in the first stage and a second element of the second segment located in the second stage; and remove the first element and the second element.

6. The non-transitory computer-readable medium of claim 5, wherein the organizational structure is a parse tree comprising a plurality of hierarchical nodes, and the first stage includes a lower hierarchical node relative to the second stage.

7. The non-transitory computer-readable medium of claim 5, wherein the instructions, when executed by the processor, cause the processor to remove the first element from the first stage before removing the second element from the second stage.

8. The non-transitory computer-readable medium of claim 5, wherein the instructions, when executed by the processor, cause the processor to remove the first element from the first stage after removing the second element from the second stage.

9. The non-transitory computer-readable medium of claim 1, wherein the first program code includes a conditional function.

10. The non-transitory computer-readable medium of claim 9, wherein the conditional function is one of an if statement or a while statement.

11. The non-transitory computer-readable medium of claim 1, wherein the value setting is received due to execution of a third program code.

12. The non-transitory computer-readable medium of claim 1, wherein the value setting is received due to a manipulation of an element of the user interface.

13. The non-transitory computer-readable medium of claim 12, wherein the manipulation comprises an interaction with at least one of a slider or a button associated with the element.

14. A method comprising:

receiving, by the one or more processors, a value setting via a user interface associated with a first program code; and generating, by the one or more processors, a second program code that, when executed, produces a computational result, the generating the second program code comprising:

obtaining a portion of the first program code that, when executed with the value setting, generates the computational result;

determining an organizational structure of the portion, the organizational structure including a plurality of stages;

determining, in one or more of the plurality of stages, a first segment of code that accesses the value setting and a second segment of code that does not access the value setting; and replacing the first segment with the value setting.

15. The method of claim 14, wherein the generating the second program code further comprises:

determining, by the one or more processors, in the one or more of the plurality of stages, a third segment of code that produces a graphical configuration of the user interface; and removing, by the one or more processors, the third segment from the one or more of the plurality of stages.

16. The method of claim 14, wherein the generating the second program code further comprises:

determining, by the one or more processors, in the one or more of the plurality of stages, a third segment of code that produces a graphical display of the computational result; and removing, by the one or more processors, the third segment from the one or more of the plurality of stages.

17. The method of claim 14, wherein the generating the second program code further comprises:

removing, by the one or more processors, the second segment from the one or more of the plurality of stages.

18. The method of claim 17, wherein the removing the second segment comprises:

determining, by the one or more processors, a first stage and a second stage in the plurality of stages;

identifying, by the one or more processors, a first element of the second segment located in the first stage and a second element of the second segment located in the second stage; and removing the first element and the second element.

19. The method of claim 18, wherein the organizational structure is a parse tree comprising a plurality of hierarchical nodes, and the first stage includes a lower hierarchical node relative to the second stage.

20. An apparatus comprising:

a processor; and memory storing instructions that, when executed by the processor, cause the apparatus to:

receive a value setting via a user interface associated with a first program code; and generate a second program code that, when executed, produces a computational result, wherein, to generate the second program code, the instructions, when executed by the processor, cause the apparatus to:

obtain a portion of the first program code that, when executed with the value setting, generates the computational result;

determine an organizational structure of the portion, the organizational structure including a plurality of stages;

determine, in one or more of the plurality of stages, a first segment of code that accesses the value setting and a second segment of code that does not access the value setting; and replace the first segment with the value setting.

21. The apparatus of claim 20, wherein, to generate the second program code, the instructions, when executed by the processor, further cause the apparatus to:

determine, in the one or more of the plurality of stages, a third segment of code that produces at least one of a graphical configuration of the user interface and a graphical display of the computational result; and remove the third segment from the one or more of the plurality of stages.

22. The apparatus of claim 20, wherein, to generate the second program code, the instructions, when executed by the processor, further cause the processor to:
remove the second segment from the one or more of the plurality of stages by
determining a first stage and a second stage in the plurality of stages,
identifying a first element of the second segment located in the first stage and a second element of the second segment located in the second stage, and
removing the first element and the second element.

* * * * *